US012686291B2

(12) United States Patent
Guo et al.

(10) Patent No.: US 12,686,291 B2
(45) Date of Patent: Jul. 21, 2026

(54) RAILWAY VEHICLE CHARGING CONTROL METHOD, RAILWAY VEHICLE, CHARGING STATION AND CHARGING SYSTEM

(71) Applicant: BYD COMPANY LIMITED, Shenzhen (CN)

(72) Inventors: Mingyang Guo, Shenzhen (CN); Hongtao She, Shenzhen (CN); Hao Lu, Shenzhen (CN); Zhicheng Tan, Shenzhen (CN); Dongmao Ma, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 795 days.

(21) Appl. No.: 18/069,742

(22) Filed: Dec. 21, 2022

(65) Prior Publication Data

US 2023/0119294 A1 Apr. 20, 2023

Related U.S. Application Data

(63) Continuation of application No. PCT/CN2021/101609, filed on Jun. 22, 2021.

(30) Foreign Application Priority Data

Jun. 24, 2020 (CN) .......................... 202010592214.8

(51) Int. Cl.
*B60L 53/66* (2019.01)
*B60L 53/35* (2019.01)
(Continued)

(52) U.S. Cl.
CPC .............. *B60L 53/66* (2019.02); *B60L 53/35* (2019.02); *B60L 53/62* (2019.02); *B60L 53/65* (2019.02);
(Continued)

(58) Field of Classification Search
CPC .......... B60L 53/66; B60L 53/35; B60L 53/62; B60L 53/65; B60L 58/12; B60L 58/18;
(Continued)

(56) References Cited

U.S. PATENT DOCUMENTS

2013/0167752 A1* 7/2013 Barbee ...................... B61C 5/00
105/1.4

FOREIGN PATENT DOCUMENTS

CN 107230355 A * 10/2017 ......... G06K 17/0022
CN 109849727 A 6/2019
(Continued)

OTHER PUBLICATIONS

Machine translation of CN-107230355-A (Year: 2025).*
English Translation of International Search Report from PCT/CN2021/101609 dated Sep. 2, 2021 (2 pages).

*Primary Examiner* — David V Henze
(74) *Attorney, Agent, or Firm* — Calfee, Halter & Griswold LLP

(57) ABSTRACT

A railway vehicle charging control method includes the following steps: receiving vehicle information of the railway vehicle and a charging request transmitted by a signal system; establishing wireless communication connection with a vehicle control unit of the railway vehicle according to the vehicle information of the railway vehicle; determining a pantograph charger corresponding to the railway vehicle; controlling the pantograph charger corresponding to the railway vehicle to descend; and controlling, according to the charging request, to start charging the railway vehicle. The method is combined with the signal system of the railway vehicle, establishes communication connection with the corresponding railway vehicle according to the charging request and the vehicle information of the railway vehicle transmitted by the signal system, and controls the panto- (Continued)

Charging station 20

Third pantograph charger 223
Second pantograph charger 222
First pantograph charger 221

Third vehicle communication module 123
Second vehicle communication module 122
First vehicle communication module 121

Third compartment power battery 133
Third BMS 1133
Second compartment power battery 132
Second BMS 1132
First compartment power battery 131
First BMS 1131

Railway vehicle 10

AAA graph charger corresponding to the railway vehicle to descend, to charge the railway vehicle.

13 Claims, 7 Drawing Sheets

(51) Int. Cl.

| | |
|---|---|
| *B60L 53/62* | (2019.01) |
| *B60L 53/65* | (2019.01) |
| *B60L 58/12* | (2019.01) |
| *B60L 58/18* | (2019.01) |
| *B61C 17/06* | (2006.01) |
| *B61L 25/02* | (2006.01) |
| *B61L 25/04* | (2006.01) |
| *B61L 27/70* | (2022.01) |

(52) U.S. Cl.
CPC ............... *B60L 58/12* (2019.02); *B60L 58/18* (2019.02); *B61C 17/06* (2013.01); *B61L*

*25/023* (2013.01); *B61L 25/04* (2013.01); *B61L 27/70* (2022.01); *B61L 2205/00* (2013.01)

(58) Field of Classification Search
CPC . B60L 5/24; B60L 53/32; B60L 53/14; B61C 17/06; B61C 3/02; B61L 25/023; B61L 25/04; B61L 27/70; B61L 27/57
See application file for complete search history.

(56) References Cited

FOREIGN PATENT DOCUMENTS

| CN | 110077255 | A | 8/2019 |
|----|-----------|---|--------|
| CN | 110254283 | A | 9/2019 |
| CN | 110723034 | A | 1/2020 |
| CN | 110758133 | A | 2/2020 |
| CN | 110816325 | A | 2/2020 |
| CN | 111231683 | A | 6/2020 |
| EP | 3231656 | A1 | 10/2017 |
| JP | S61207102 | A | 9/1986 |

* cited by examiner

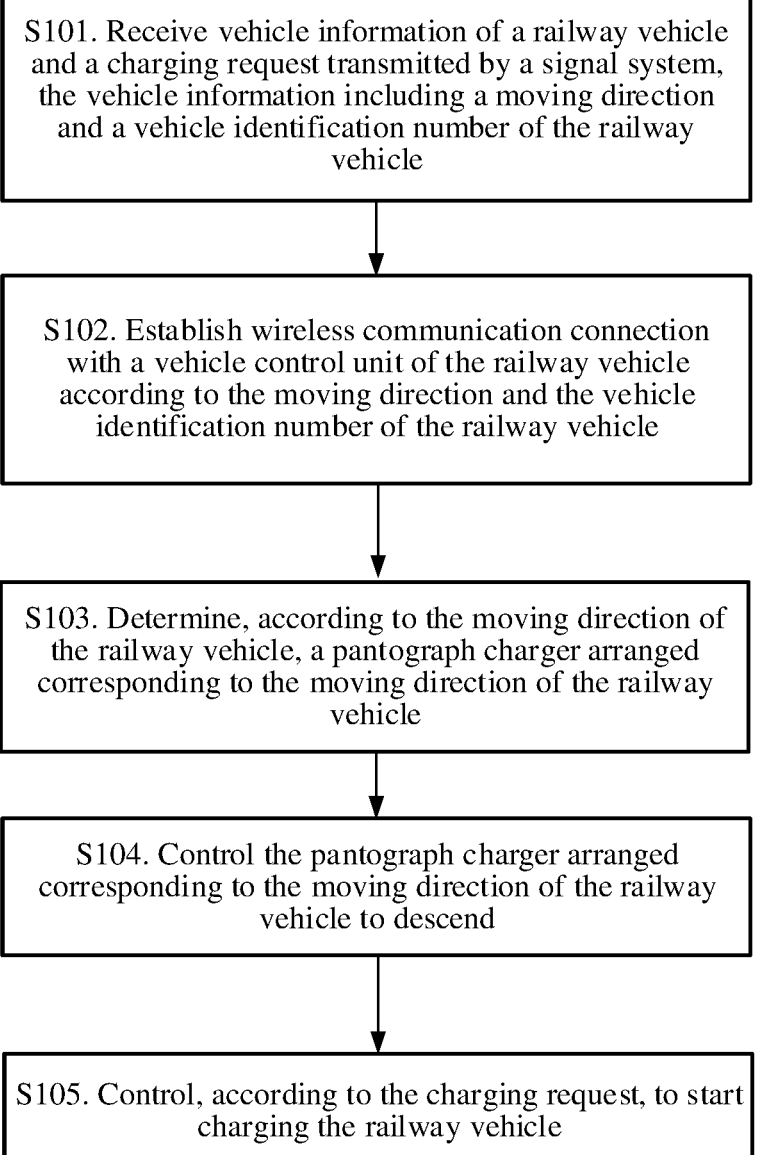

S101. Receive vehicle information of a railway vehicle and a charging request transmitted by a signal system, the vehicle information including a moving direction and a vehicle identification number of the railway vehicle S102. Establish wireless communication connection with a vehicle control unit of the railway vehicle according to the moving direction and the vehicle identification number of the railway vehicle S103. Determine, according to the moving direction of the railway vehicle, a pantograph charger arranged corresponding to the moving direction of the railway vehicle S104. Control the pantograph charger arranged corresponding to the moving direction of the railway vehicle to descend S105. Control, according to the charging request, to start charging the railway vehicle

FIG. 3

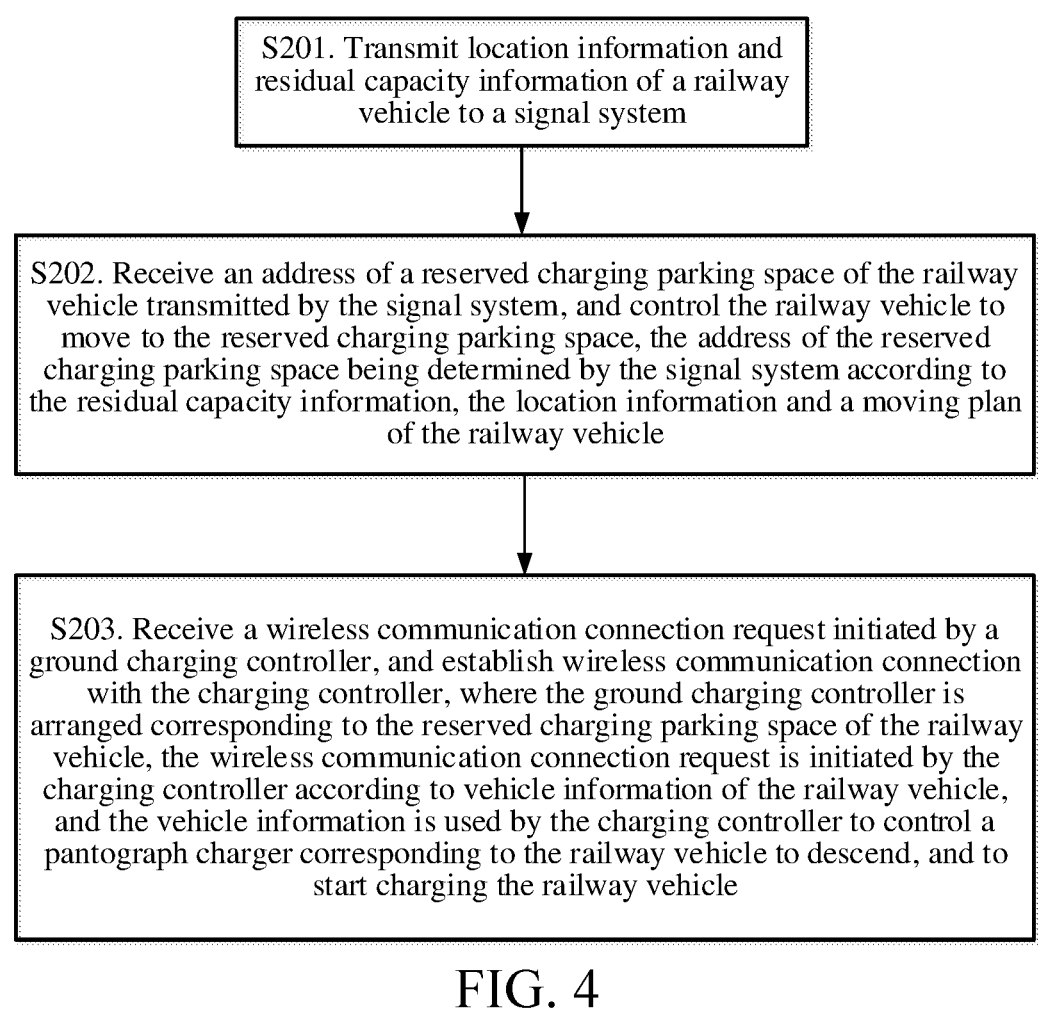

S201. Transmit location information and residual capacity information of a railway vehicle to a signal system S202. Receive an address of a reserved charging parking space of the railway vehicle transmitted by the signal system, and control the railway vehicle to move to the reserved charging parking space, the address of the reserved charging parking space being determined by the signal system according to the residual capacity information, the location information and a moving plan of the railway vehicle S203. Receive a wireless communication connection request initiated by a ground charging controller, and establish wireless communication connection with the charging controller, where the ground charging controller is arranged corresponding to the reserved charging parking space of the railway vehicle, the wireless communication connection request is initiated by the charging controller according to vehicle information of the railway vehicle, and the vehicle information is used by the charging controller to control a pantograph charger corresponding to the railway vehicle to descend, and to start charging the railway vehicle

FIG. 4

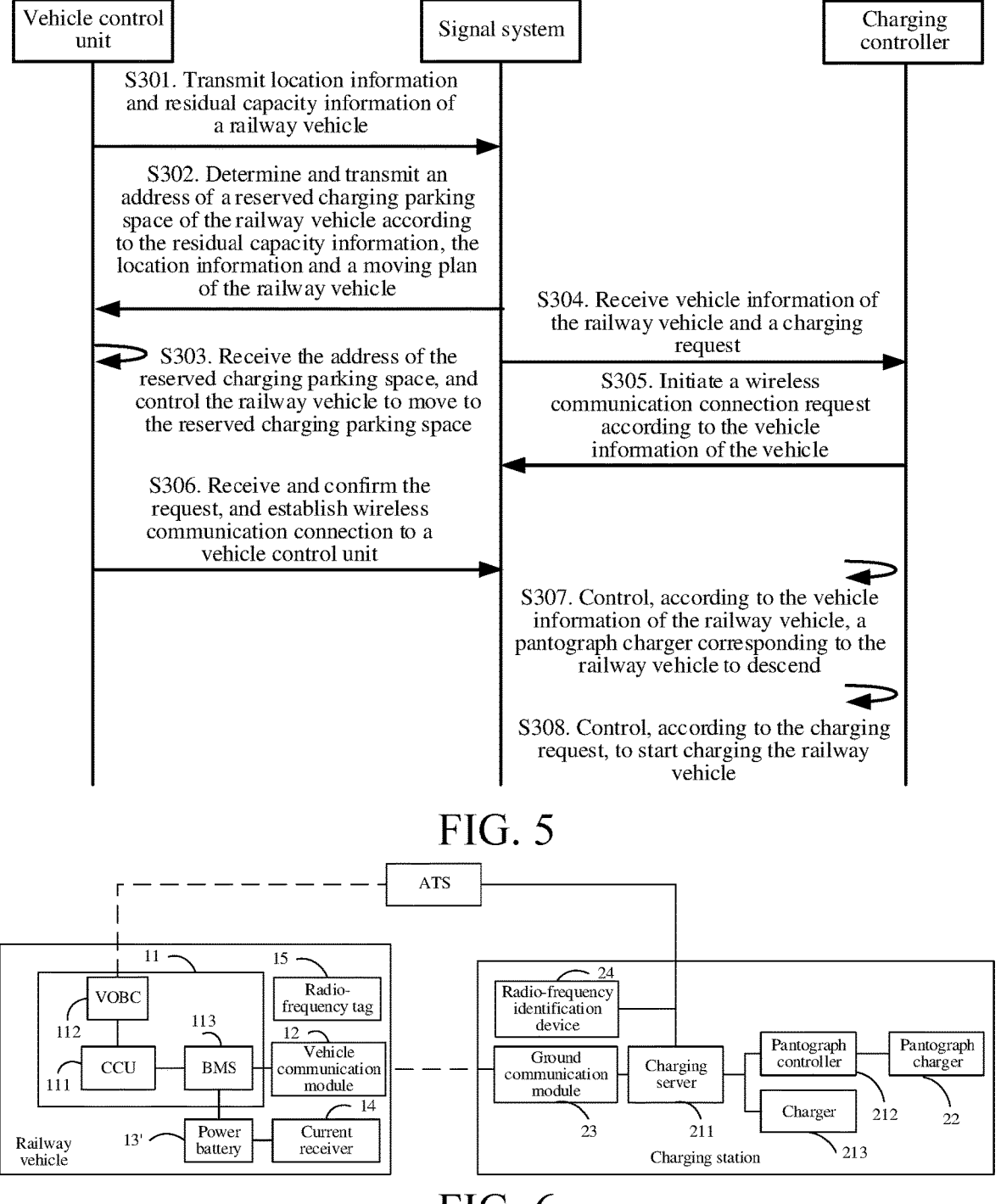

| Vehicle control unit | | Signal system | | Charging controller |

S301. Transmit location information and residual capacity information of a railway vehicle S302. Determine and transmit an address of a reserved charging parking space of the railway vehicle according to the residual capacity information, the location information and a moving plan of the railway vehicle S304. Receive vehicle information of the railway vehicle and a charging request S303. Receive the address of the reserved charging parking space, and control the railway vehicle to move to the reserved charging parking space S305. Initiate a wireless communication connection request according to the vehicle information of the vehicle S306. Receive and confirm the request, and establish wireless communication connection to a vehicle control unit S307. Control, according to the vehicle information of the railway vehicle, a pantograph charger corresponding to the railway vehicle to descend S308. Control, according to the charging request, to start charging the railway vehicle

FIG. 5

ATS

| 11 | 15 | | 24 |
| VOBC | Radio-frequency tag | | Radio-frequency identification device |
| 112 | 113 | 12 | |
| | | Vehicle communication module | Ground communication module |
| CCU | BMS | | |
| 111 | | 14 | |
| Railway vehicle | 13' | Power battery | Current receiver |

Charging server

Pantograph controller

Pantograph charger

Charger　212　22

23　　211

Charging station　213

FIG. 6

RAILWAY VEHICLE CHARGING CONTROL METHOD, RAILWAY VEHICLE, CHARGING STATION AND CHARGING SYSTEM

CROSS-REFERENCE TO RELATED APPLICATIONS

The present disclosure is a bypass continuation application of PCT International Application No. PCT/CN2021/101609, filed on Jun. 22, 2021, which claims priority to Chinese Patent Application No. 202010592214.8 filed on Jun. 24, 2020, and entitled "RAILWAY VEHICLE CHARGING CONTROL METHOD, RAILWAY VEHICLE, CHARGING STATION AND CHARGING SYSTEM", which are incorporated herein by reference in their entireties.

FIELD

The present disclosure relates to the field of vehicle charging, and more specifically, to a railway vehicle charging control method, a railway vehicle, a charging station and a charging system.

BACKGROUND

In the related art, power supply of railway vehicles generally uses an approach of power supply along the line. For example, high-speed railways use conductive cables laid along the lines, and pantographs on the railway vehicles are in contact with the conductive cables to obtain electricity. Subways use conductive rails laid along the lines, and current receivers on the railway vehicles are in contact with the conductor rails to obtain electricity. In this way, conductive rails or conductive cables need to be laid along the line, and the cost is high.

In the related art, there is also an approach of using a power battery to supply power to the railway vehicle. Before running, the railway vehicle is in a vehicle depot, and the railway vehicle is charged manually, and then participates in operation after it is fully charged. In this way, ground charging equipment cannot obtain status information of the railway vehicle, and cannot realize automatic charging of the railway vehicle, and a charging system and a signal system are independent of each other.

SUMMARY

The present disclosure is intended to resolve the technical problems in the related art at least to some extent.

In a first aspect, the present disclosure provides a railway vehicle charging control method. The method includes the following steps: receiving vehicle information of the railway vehicle and a charging request transmitted by a signal system; establishing wireless communication connection with a vehicle control unit of the railway vehicle according to the vehicle information of the railway vehicle; determining a pantograph charger corresponding to the railway vehicle; controlling the pantograph charger corresponding to the railway vehicle to descend; and controlling, according to the charging request, to start charging the railway vehicle.

In a second aspect, the present disclosure provides a railway vehicle charging control method. The method includes the following steps: transmitting location information and residual capacity information of a railway vehicle to a signal system; receiving an address of a reserved charging parking space of the railway vehicle transmitted by the signal system, and controlling the railway vehicle to move to the reserved charging parking space, the address of the reserved charging parking space being determined by the signal system according to the residual capacity information, the location information and a moving plan of the railway vehicle, and receiving a wireless communication connection request initiated by a ground charging controller, and establishing wireless communication connection with the charging controller. The charging controller is arranged corresponding to the reserved charging parking space of the railway vehicle, the wireless communication connection request is initiated by the charging controller according to vehicle information of the railway vehicle, and the vehicle information is used by the charging controller to control a pantograph charger corresponding to the railway vehicle to descend, and to start charging the railway vehicle according to a charging request of the signal system.

In a third aspect, the present disclosure provides a railway vehicle charging control method. The method includes the following steps: obtaining, by a signal system, location information and residual capacity information of a railway vehicle, determining an address of a reserved charging parking space of the railway vehicle according to the residual capacity information, the location information and a moving plan of the railway vehicle, and transmitting the address of the reserved charging parking space to a vehicle control unit of the railway vehicle; receiving, by the vehicle control unit, the address of the reserved charging parking space of the railway vehicle transmitted by the signal system, and controlling the railway vehicle to move to the reserved charging parking space; transmitting, by the signal system, vehicle information of the railway vehicle and a charging request to a ground charging controller, the ground charging controller being arranged corresponding to the reserved charging parking space of the railway vehicle; initiating, by the charging controller, a wireless communication connection request according to the vehicle information of the railway vehicle, and after the vehicle control unit receives and confirms the wireless communication connection request, establishing wireless communication connection between the charging controller and the vehicle control unit; and controlling, by the charging controller according to the vehicle information of the railway vehicle, a pantograph charger corresponding to the railway vehicle to descend, and controlling, according to the charging request, to start charging the railway vehicle.

In a fourth aspect, the present disclosure provides a railway vehicle, including a vehicle control unit, an energy storage device, a current receiver, and a vehicle communication module. The energy storage device is configured to supply power to the railway vehicle. The current receiver is electrically connected to a pantograph charger in response to that the railway vehicle needs to be charged. The vehicle communication module is configured to provide wireless communication connection. The vehicle control unit is configured to transmit location information and residual capacity information of the railway vehicle to a signal system, receive an address of a reserved charging parking space of the railway vehicle transmitted by the signal system, control the railway vehicle to move to the reserved charging parking space, the address of the reserved charging parking space being determined by the signal system according to the residual capacity information, the location information and a moving plan of the railway vehicle, and receive a wireless communication connection request initiated by a ground charging controller, and establish wireless communication connection with the charging controller. The charging controller is arranged corresponding to the reserved charging parking space of the railway vehicle, the wireless communication connection request is initiated by the charging controller according to vehicle information of the railway vehicle, and the vehicle information is used by the charging controller to control a pantograph charger corresponding to the railway vehicle to descend, and to start charging the railway vehicle according to a charging request of the signal system.

In a fifth aspect, the present disclosure provides a charging station, including a ground charging controller, a pantograph charger, and a ground communication module. The pantograph charger is connected to the charging controller. The ground communication module is configured to provide wireless communication connection. The charging controller is configured to receive vehicle information of the railway vehicle and a charging request transmitted by a signal system, the vehicle information including a moving direction and a vehicle identification number of the railway vehicle, establish wireless communication connection with a vehicle control unit of the railway vehicle according to the moving direction and the vehicle identification number of the railway vehicle, determine a pantograph charger corresponding to the moving direction of the railway vehicle according to the moving direction of the railway vehicle, control the pantograph charger arranged corresponding to the moving direction of the railway vehicle to descend, and control, according to the charging request, to start charging the railway vehicle.

In a sixth aspect, the present disclosure provides a charging system, including a signal system, the railway vehicle, and the charging station.

BRIEF DESCRIPTION OF THE DRAWINGS

The foregoing and/or additional aspects and advantages of the present disclosure will become apparent and comprehensible in the description of embodiments made with reference to the following accompanying drawings.

FIG. 3 is a schematic flowchart I of a railway vehicle charging control method according to an embodiment of the present disclosure;

FIG. 4 is a schematic flowchart II of a railway vehicle charging control method according to an embodiment of the present disclosure;

FIG. 5 is a schematic flowchart III of a railway vehicle charging control method according to an embodiment of the present disclosure;

FIG. 6 is a schematic architectural diagram of a charging system according to an embodiment of the present disclosure;

DETAILED DESCRIPTION

Figures 1, 2:
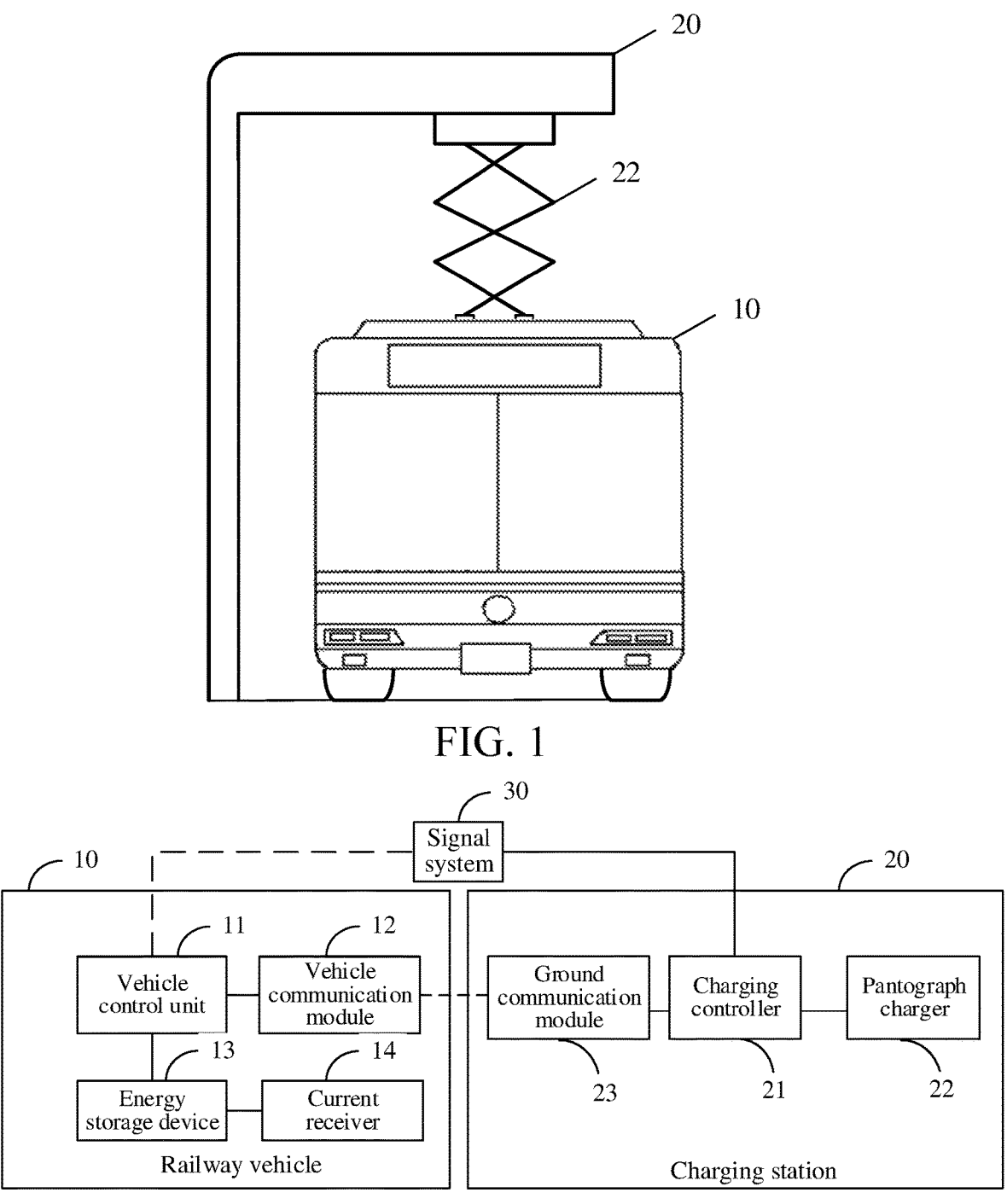
FIG. 1 is a schematic scene diagram of a railway vehicle charging control method according to an embodiment of the present disclosure.
FIG. 2 is a schematic architectural diagram of a charging system according to an embodiment of the present disclosure.

The following describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure shall fall within the protection scope of the present disclosure.

In the related art, power supply of railway vehicles generally uses an approach of power supply along the line. For example, high-speed railways use conductive cables laid along the lines, and pantographs on the railway vehicles are in contact with the conductive cables to obtain electricity. Subways use conductive rails laid along the lines, and current receivers on the railway vehicles are in contact with the conductor rails to obtain electricity. In this way, conductive rails or conductive cables need to be laid along the line, and the cost is high.

In the related art, there is also an approach of using a power battery to supply power to the railway vehicle. Before running, the railway vehicle is in a vehicle depot, and the railway vehicle is charged manually, and then participates in operation after it is fully charged. In this way, automatic charging of railway vehicles cannot be realized, ground charging equipment cannot obtain status information of the railway vehicle in real time, and a charging system and a signal system are independent of each other in the charging process. The present disclosure aims at the related arts, and combines the charging system with the signal system to realize automatic charging of the railway vehicle, so that the railway vehicle may also be charged during the operation process, and the charging efficiency and operation efficiency are improved. At the same time, the ground charging equipment may obtain the status information of railway vehicles in real time, so that the signal system may monitor the status information of the railway vehicle in real time, improving the safety of operation, and the railway vehicle may also be scheduled in time according to the status information of railway vehicle.

The railway vehicle charging control method provided by the present disclosure is combined with the signal system of the railway vehicle, establishes communication connection with the corresponding railway vehicle according to the charging request and the vehicle information of the railway vehicle transmitted by the signal system, and controls the pantograph charger corresponding to the railway vehicle to descend, to charge the railway vehicle. By establishing communication connection with the railway vehicle, status information of the railway vehicle is obtained in time. The entire charging process is fully automated, high in charging efficiency, safe and reliable.

The railway vehicle charging control method provided by the present disclosure is combined with the signal system of the railway vehicle. The signal system determines a reserved charging parking space according to the residual capacity information, the location information and the moving plan of the railway vehicle. After moving to the reserved charging parking space, the railway vehicle establishes communication connection with a corresponding charging controller. After a corresponding pantograph charger is controlled to descend, the railway vehicle is controlled to be charged. By establishing communication connection with the corresponding charging station, the vehicle status information is transmitted to the charging controller in time. Moreover, the entire charging process is fully automated, high in charging efficiency, safe and reliable.

The railway vehicle charging control method provided by the present disclosure is combined with the signal system of the railway vehicle. The signal system determines the reserved charging parking space of the railway vehicle according to the residual capacity information, the location information and the moving plan of the railway vehicle, and transmits the charging request and the vehicle information of the railway vehicle. The vehicle control unit and the charging controller establish communication connection through the vehicle information, and the pantograph charger corresponding to the railway vehicle is controlled to descend, to charge the railway vehicle. The vehicle control unit and the charging controller establish communication connection, and status information of the railway vehicle is obtained in time. The entire charging process is fully automated, high in charging efficiency, safe and reliable.

The technical solutions of the present disclosure are further described in detail with reference to the accompanying drawings.

FIG. 1 is a schematic scene diagram of a railway vehicle charging control method according to an embodiment of the present disclosure. As shown in FIG. 1, the charging system includes a ground charging station 20 and a railway vehicle 10. The charging station 20 includes a pantograph charger 22. In response to that the railway vehicle 10 needs to be charged, the pantograph charger 22 descends to be in contact with and electrically connected to a current receiver (not shown) on the railway vehicle 10 to charge the railway vehicle 10.

In order to conveniently describe a scene of a railway vehicle charging control method, FIG. 2 is a schematic architectural diagram of a charging system according to an embodiment of the present disclosure. As shown in FIG. 2, the charging system includes a railway vehicle 10, a signal system 30, and a ground charging station 20. The signal system 30 is wirelessly connected to the railway vehicle 10, and the signal system 30 is connected to the charging station 20 through a hard wire. The railway vehicle 10 includes a vehicle control unit 11, an energy storage device 13, a current receiver 14, and a vehicle communication module 12. The energy storage device 13 is configured to supply power to the railway vehicle. The current receiver 14 is connected to the pantograph charger in response to that the railway vehicle needs to be charged. The vehicle communication module 12 is configured to provide wireless communication connection. The charging station 20 includes a ground charging controller 21, a pantograph charger 22, and a ground communication module 23. The pantograph charger 22 is connected to the charging controller 21. The ground communication module 23 is configured to provide wireless communication connection. In response to that the railway vehicle 10 needs to be charged, the pantograph charger 22 descends to be in contact with and electrically connected to the current receiver 14. The charging station 20 may be arranged on a railway platform, a vehicle depot, a parking lot, or the like.

Reference is made to FIG. 3. FIG. 3 is a schematic flowchart of a railway vehicle charging control method according to an embodiment of the present disclosure. As shown in FIG. 3, the method is applied to the ground charging controller. The signal system 30 in the present disclosure includes but not limited to an Automatic Train Supervision (ATS) system, an Automatic Train Protection (ATP) system, and an Automatic Train Operation (ATO) system. The signal system in this embodiment is the ATS. The method includes the following steps:

S101: Vehicle information of the railway vehicle and a charging request transmitted by an ATS are received, the vehicle information including a moving direction and a vehicle identification number of the railway vehicle.

The vehicle information includes at least the moving direction and the vehicle identification number of the railway vehicle. It is to be understood that the moving direction usually includes an up direction and a down direction, or a forward direction and a reverse direction. The vehicle identification number is used for representing a code of the vehicle and grouping of the vehicle. Each vehicle running on the line has a unique vehicle code, and the grouping of the vehicle indicates that the vehicle is composed of several compartments. For example, 03ZX001 indicates that the code of the vehicle is ZX001, and the railway vehicle consists of three compartments.

Furthermore, in response to that the vehicle information of the railway vehicle transmitted by the signal system is not received within a predetermined period of time, a radio-frequency identification device 24 scans a radio-frequency tag 15 on the railway vehicle to obtain the vehicle information of the railway vehicle. In response to that the signal system fails, the vehicle information of the railway vehicle may be obtained through the radio-frequency tag 15 on the railway vehicle, thereby improving the charging safety and reliability.

S102: Wireless communication connection is established with a vehicle control unit of the railway vehicle according to the vehicle information of the railway vehicle.

Specifically, a wireless communication connection request is initiated to the vehicle control unit of the railway vehicle according to the vehicle information of the railway vehicle, and after the vehicle control unit receives and confirms the wireless communication connection request, wireless communication connection is established with the vehicle control unit.

As a possible implementation, the vehicle information includes a moving direction and a vehicle identification number of the railway vehicle. The charging server finds, according to a configuration table, a wireless network user name and password corresponding to the moving direction and the vehicle identification number of the railway vehicle, and transmits the wireless network user name and password to the vehicle control unit. The vehicle control unit receives and compares the wireless network user name and password with a pre-stored wireless network user name and password, and wireless communication connection is established with the vehicle control unit after the wireless network user name and password is confirmed to be consistent with the pre-stored wireless network user name and password.

S103: A pantograph charger arranged corresponding to the moving direction of the railway vehicle is determined according to the vehicle information of the railway vehicle.

The ground charging controller is configured to control lifting/lowering of all pantograph chargers. Each pantograph charger has an identity identification code. In response to that the moving direction of the railway vehicle is the up direction, all pantograph chargers corresponding to the up direction are determined through the identity identification codes. In response to that the moving direction of the railway vehicle is the down direction, all pantograph chargers corresponding to the down direction are determined through the identity identification codes. A pantograph charger may correspond to both the up direction and the down direction.

S104: The pantograph charger corresponding to the railway vehicle is controlled to descend.

As a possible implementation, the vehicle information includes a moving direction and a vehicle identification number of the railway vehicle. The determining, according to the vehicle information of the railway vehicle, a pantograph charger corresponding to the railway vehicle specifically includes:

determining, according to the vehicle identification number of the railway vehicle, a pantograph charger corresponding to each compartment of the railway vehicle. The vehicle identification number includes grouping information of the railway vehicle. Taking a 3-group train as an example, the 3-group railway vehicle includes three compartments, and the pantograph charger corresponding to the railway vehicle is determined, that is, the pantograph charger corresponding to the three compartments is determined.

A pantograph charger arranged conforming to the moving direction of the railway vehicle is determined according to the moving direction of the railway vehicle. Specifically, in response to that the moving direction of the railway vehicle is the up direction, a pantograph charger arranged conforming to the up direction of the railway vehicle is determined. In response to that the moving direction of the railway vehicle is the down direction, a pantograph charger arranged conforming to the down direction of the railway vehicle is determined.

The pantograph charger corresponding to the railway vehicle is finally determined. The pantograph charger corresponding to the railway vehicle is a pantograph charger that corresponds to each compartment of the railway vehicle and is arranged conforming to the moving direction. In this implementation, in response to determining the pantograph charger corresponding to the railway vehicle, it needs to be determined according to the vehicle information of the railway vehicle, that is, it needs to be determined according to the moving direction and the vehicle identification number of the railway vehicle, which ensures the charging accuracy and safety.

As a possible implementation, the vehicle information includes a moving direction and a vehicle identification number of the railway vehicle, and residual capacity information of each compartment. The determining, according to the vehicle information of the railway vehicle, a pantograph charger corresponding to the railway vehicle specifically includes:

determining, according to the vehicle identification number of the railway vehicle and the residual capacity information of each compartment, a pantograph charger corresponding to a to-be-charged compartment of the railway vehicle. The vehicle identification number includes grouping information of the railway vehicle. Taking a 3-group train as an example, the 3-group railway vehicle includes three compartments. The residual capacity information of each compartment displays that a second compartment is the to-be-charged compartment, and the pantograph charger corresponding to the railway vehicle is determined, that is, a pantograph charger corresponding to the second to-be-charged compartment is determined.

A pantograph charger that is arranged conforming to the moving direction of the railway vehicle is determined according to the moving direction of the railway vehicle. Specifically, in response to that the moving direction of the railway vehicle is the up direction, a pantograph charger arranged conforming to the up direction of the railway vehicle is determined. In response to that the moving direction of the railway vehicle is the down direction, a pantograph charger arranged conforming to the down direction of the railway vehicle is determined.

The pantograph charger corresponding to the railway vehicle is finally determined. The pantograph charger corresponding to the railway vehicle is a pantograph charger that corresponds to the to-be-charged compartment of the railway vehicle and is arranged conforming to the moving direction.

In this implementation, in response to determining the pantograph charger corresponding to the railway vehicle, it needs to be determined according to the vehicle information of the railway vehicle, that is, it needs to be determined according to the moving direction and the vehicle identification number of the railway vehicle and the residual capacity of each compartment, and only the compartment that needs to be charged is charged, realizing charging intellectualization and ensuring the charging accuracy and safety.

The following steps may also be executed after step S104:

determining whether pantograph charger descending is pantograph descending in place.

In this embodiment, pantograph descending in place refers to that the pantograph charger is in full contact with and electrically connected to the current receiver on the railway vehicle. Specifically, a pressure sensor or a distance sensor may be arranged on the pantograph charger, and whether pantograph descending is in place may be determined through a pressure signal or a distance signal, and whether pantograph descending is in place may also be determined by detecting an electrical signal. Whether pantograph descending is in place is determined by arranging mutually coupled circuits on the vehicle and the pantograph charger respectively, and measuring the magnitude of a voltage at a detection point. The potential safety hazards caused by pantograph descending not in place may be avoided by determining whether pantograph descending is in place, and the charging safety and reliability may be improved.

A pantograph descending in place signal may also determine whether pantograph descending is in place by arranging the pressure sensor or the distance sensor on the railway vehicle and detecting the pressure signal or the distance signal through the vehicle control unit, and the pantograph descending in place signal is transmitted to the charging controller.

S105: Starting charging the railway vehicle is controlled according to the charging request.

Specifically, it is controlled to start charging each compartment of the railway vehicle, and the residual capacity of each compartment does not need to be considered at this time. It may also be controlled to start charging only a to-be-charged compartment of the railway vehicle. The to-be-charged compartment of the railway vehicle is determined according to the residual capacity information of the railway vehicle.

In this embodiment, the determining a to-be-charged compartment of the railway vehicle specifically includes the following steps:

establishing, by the charging controller, wireless communication connection with a vehicle control unit of the railway vehicle; and determining, by the vehicle control unit, a to-be-charged compartment according to residual capacity information of each compartment, and transmitting the residual capacity information of the to-be-charged compartment to the charging controller.

As a possible implementation, in order to ensure the consistency of charging of each compartment, that is, in order to ensure that all compartments are fully charged at the same time, to ensure that all pantograph chargers may be ascended at the same time, thereby improving the operational efficiency of railway vehicles, the charging server may also determine a target charging current for each compartment according to the residual capacity and a target capacity of each compartment.

The target charging current of each compartment is determined. As a possible implementation, first, the current charging current of a compartment with the smallest residual capacity is obtained, the charging reference time is determined according to the residual capacity and the current charging current of the compartment with the smallest residual capacity, then the target charging current of each compartment is calculated based on the charging reference time, the residual capacity of each compartment and the target capacity, and the charging server controls the charging of each compartment according to the target charging current.

The target charging current of each compartment is determined. As another possible implementation, first, the residual capacity of all compartments is obtained, an average value is calculated, and the current charging current of a compartment with the smallest difference between the residual capacity and the average value is obtained, the charging reference time is determined according to the residual capacity and the current charging current of the compartment, then the target charging current of each compartment is calculated based on the charging reference time, the residual capacity of each compartment and the target capacity, and the charging server controls the charging of each compartment according to the target charging current.

Furthermore, the pantograph charger is controlled to ascend in response to that the charging of the railway vehicle is ended, and pantograph chargerstatus information indicating that the pantograph charger is ascended is transmitted to the vehicle control unit and the signal system.

According to the railway vehicle charging control method in this embodiment, communication connection is established with the corresponding railway vehicle according to the charging request and the vehicle information of the railway vehicle transmitted by the signal system, and the pantograph charger corresponding to the railway vehicle is controlled to descend, to charge the railway vehicle. By establishing communication connection with the railway vehicle, status information of the railway vehicle is obtained in time. The entire charging process is fully automated, high in charging efficiency, safe and reliable. The railway vehicle charging control method in this embodiment combines the charging system with the signal system to realize automatic charging of the railway vehicle, so that the railway vehicle may also be charged during the operation process, and the charging efficiency and operation efficiency are improved. At the same time, the ground charging equipment may obtain the status information of railway vehicles in real time, so that the signal system may monitor the status information of the railway vehicle in real time, improving the safety of operation, and the railway vehicle may also be scheduled in time according to the status information of railway vehicle.

Reference is made to FIG. 4. FIG. 4 is a schematic flowchart of a railway vehicle charging control method according to an embodiment of the present disclosure. As shown in FIG. 4, the method is applied to the vehicle control unit of the railway vehicle. In this embodiment, the signal system includes but not limited to an Automatic Train Supervision (ATS) system, an Automatic Train Protection (ATP) system, and an Automatic Train Operation (ATO) system. The signal system in this embodiment is the ATS. This embodiment includes the following steps:

S201: Location information and residual capacity information of a railway vehicle are transmitted to an ATS.

S202: Receive an address of a reserved charging parking space of the railway vehicle transmitted by the ATS, and control the railway vehicle to move to the reserved charging parking space, the address of the reserved charging parking space being determined by the ATS according to the residual capacity information, the location information and a moving plan of the railway vehicle Specifically, a cruising range of the railway vehicle may be determined according to the residual capacity information and the location information of the railway vehicle, that is, how far the railway vehicle may travel on the residual capacity. The address of the reserved charging parking space of the railway vehicle is determined according to the cruising range and the moving plan. The moving plan of the railway vehicle is pre-stored in the ATS, and the residual capacity information of the railway vehicle includes the residual capacity information of each compartment.

As a possible implementation, the railway vehicle may also determine a cruising range of the railway vehicle according to the residual capacity information and the location information of the railway vehicle, report the cruising range, and determine the address of the reserved charging parking space of the railway vehicle according to the cruising range and the moving plan.

S203: A wireless communication connection request initiated by a ground charging controller is received, and wireless communication connection is established with the charging controller. The ground charging controller is arranged corresponding to the reserved charging parking space of the railway vehicle. The wireless communication connection request is initiated by the charging controller according to vehicle information of the railway vehicle. The vehicle information is used by the charging controller to control a pantograph charger corresponding to the railway vehicle to descend, and to start charging the railway vehicle.

After the pantograph charger descends, a pressure sensor and a distance sensor may be arranged on the railway vehicle, and whether pantograph descending is in place may be determined through a pressure signal or a distance signal, and whether pantograph descending is in place may also be determined by detecting an electrical signal.

The railway vehicle charging control method according to this embodiment is combined with the signal system of the railway vehicle. The signal system determines a reserved charging parking space according to the residual capacity information, the location information and the moving plan of the railway vehicle. After moving to the reserved charging parking space, the railway vehicle establishes communication connection with a corresponding charging controller. After the pantograph charger descends, it is started to charge the railway vehicle. By establishing communication connection with the corresponding charging controller, communication connection is established with the charging station. The vehicle status information is transmitted to the charging controller in time. Moreover, the entire charging process is fully automated, high in charging efficiency, safe and reliable.

Reference is made to FIG. 5. FIG. 5 is a schematic flowchart of a railway vehicle charging control method according to an embodiment of the present disclosure. As shown in FIG. 5, the method embodiment includes the following steps:

S301: The vehicle control unit transmits location information and residual capacity information of a railway vehicle to an ATS.

S302. The ATS determines an address of a reserved charging parking space of the railway vehicle according to the residual capacity information, the location information and a moving plan of the railway vehicle, and transmits the address of the reserved charging parking space to the vehicle control unit. Specifically, a cruising range of the railway vehicle may be determined according to the residual capacity information and the location information of the railway vehicle, that is, how far the railway vehicle may travel on the residual capacity. The address of the reserved charging parking space of the railway vehicle is determined according to the cruising range and the moving plan. The moving plan of the railway vehicle is pre-stored in the ATS.

The moving plan includes arrival time, departure time, stop time, stop site, and charging status, etc.

The address of the reserved charging parking space includes location information of the reserved charging parking space, information of a station to which it belongs, information of a station to which it belongs, information of a vehicle depot to which it belongs, etc.

As a possible implementation, the vehicle control unit may also determine the cruising range of the railway vehicle according to the residual capacity information and the location information of the railway vehicle, report the cruising range to the ATS, and the address of the reserved charging parking space of the railway vehicle is determined by the ATS according to the cruising range and the moving plan.

S303. The vehicle control unit receives the address of the reserved charging parking space transmitted by the ATS, and controls the railway vehicle to move to the reserved charging parking space.

After step S303 is executed, the method further includes the following steps:

The ATS transmits moving-in-place information to the charging controller after determining that the railway vehicle moves to the reserved charging parking space.

The ATS determines that the railway vehicle moves to the reserved charging parking space, specifically including:

reporting, by the vehicle control unit, the location information of the railway vehicle in real time; comparing, by the ATS, the location information of the railway vehicle with the address of the reserved charging parking space; and if consistent, determining that the railway vehicle moves to the reserved charging parking space. The reserved charging parking space may be the parking space of the railway vehicle, or may be arranged separately and is not the parking space of the railway vehicle.

S304: The ATS transmits vehicle information of the railway vehicle and a charging request to a ground charging controller. The ground charging controller is arranged corresponding to the reserved charging parking space of the railway vehicle.

The vehicle information includes at least the moving direction and the vehicle identification number of the railway vehicle. It is to be understood that the moving direction usually includes an up direction and a down direction, or a forward direction and a reverse direction. The vehicle identification number is used for representing a code of the vehicle and grouping of the vehicle. Each vehicle running on the line has a unique vehicle code, and the grouping of the vehicle indicates that the vehicle is composed of several compartments. For example, 0103ZX001 indicates that the code of the vehicle is ZX001, and the railway vehicle consists of three compartments.

In this embodiment, each compartment is provided with a radio-frequency tag 15, or only a head vehicle or a tail vehicle is provided with a radio-frequency tag 15, or each of the head vehicle and the tail vehicle is provided with a radio-frequency tag 15, and the setting mode is not limited herein.

As a possible implementation, taking a 3-group vehicle as an example, the head vehicle and the tail vehicle are each provided with a radio-frequency tag. Vehicle information stored in the radio-frequency tag on the head vehicle is 0103ZX001. 0103ZX001 indicates that the moving direction of the railway vehicle is the up direction, the code of the railway vehicle is ZX001, and the railway vehicle is composed of three compartments. The vehicle information stored by the radio-frequency tag on the tail vehicle is 1003ZX001. 1003ZX001 indicates that the moving direction of the railway vehicle is the down direction, the code of the railway vehicle is ZX001, and the railway vehicle is composed of three compartments.

In this embodiment, steps S302 and S304 are executed in no particular order, and may or may not be executed at the same time.

As a possible implementation, after receiving the charging request of the railway vehicle transmitted by the ATS, the charging controller calculates a charging duration and feeds back to the signal system. The signal system adjusts an operation plan according to the estimated charging duration and the address of the reserved charging parking space.

The ATS develops an operation plan for the entire line every day. The operation plan includes a moving plan of all railway vehicles on the line. Specifically, it includes the arrival and departure time of all railway vehicles, the time it takes to enter and exit the station, stay, avoidance, and overtake, which vehicles are idle and may be operated online, and the time these vehicles need to go online and offline, which vehicles are in charging status, how long it takes to be fully charged, etc.

S305: The charging controller receives the vehicle information of the railway vehicle and the charging request, and initiates a wireless communication connection request to the vehicle control unit according to the vehicle information of the railway vehicle.

S306: After receiving and confirming the request, the vehicle control unit establishes wireless communication connection to the charging controller.

Specifically, the charging controller initiates a wireless communication connection request to the vehicle control unit of the railway vehicle according to the vehicle information of the railway vehicle, and after the vehicle control unit receives and confirms the wireless communication connection request, wireless communication connection is established with the vehicle control unit.

As a possible implementation, the vehicle information includes a moving direction and a vehicle identification number of the railway vehicle. The charging controller finds, according to a configuration table, a wireless network user name and password corresponding to the moving direction and the vehicle identification number of the railway vehicle, and transmits the wireless network user name and password to the vehicle control unit. The vehicle control unit receives and compares the wireless network user name and password with a pre-stored wireless network user name and password, and wireless communication connection is established with the vehicle control unit after the wireless network user name and password is confirmed to be consistent with the pre-stored wireless network user name and password.

Furthermore, in response to that the vehicle information of the railway vehicle transmitted by the signal system is not received within a predetermined period of time, a radio-frequency identification device scans a radio-frequency tag on the railway vehicle to obtain the vehicle information of the railway vehicle.

In this embodiment, the charging controller establishes wireless communication connection with the vehicle control unit, the vehicle control unit transmits the vehicle information to the charging server, and the charging server receives and compares the vehicle information with the vehicle information transmitted by the ATS, and if they are consistent, it is determined that the communication connection is correct, and the following steps may be executed.

S307: The charging controller controls, according to the vehicle information of the railway vehicle, a pantograph charger corresponding to the railway vehicle to descend.

As a possible implementation, the vehicle information includes a moving direction and a vehicle identification number of the railway vehicle. The determining, according to the vehicle information of the railway vehicle, a pantograph charger corresponding to the railway vehicle specifically includes:

determining, according to the vehicle identification number of the railway vehicle, a pantograph charger corresponding to each compartment of the railway vehicle. The vehicle identification number includes grouping information of the railway vehicle. Taking a 3-group train as an example, the 3-group railway vehicle includes three compartments, and the pantograph charger corresponding to the railway vehicle is determined, that is, the pantograph charger corresponding to the three compartments is determined.

A pantograph charger arranged conforming to the moving direction of the railway vehicle is determined according to the moving direction of the railway vehicle. Specifically, in response to that the moving direction of the railway vehicle is the up direction, a pantograph charger arranged conforming to the up direction of the railway vehicle is determined. In response to that the moving direction of the railway vehicle is the down direction, a pantograph charger arranged conforming to the down direction of the railway vehicle is determined.

The pantograph charger corresponding to the railway vehicle is finally determined. The pantograph charger corresponding to the railway vehicle is a pantograph charger that corresponds to each compartment of the railway vehicle and is arranged conforming to the moving direction. In this implementation, in response to determining the pantograph charger corresponding to the railway vehicle, it needs to be determined according to the vehicle information of the railway vehicle, that is, it needs to be determined according to the moving direction and the vehicle identification number of the railway vehicle, which ensures the charging accuracy and safety.

As a possible implementation, the vehicle information includes a moving direction and a vehicle identification number of the railway vehicle, and residual capacity information of each compartment. The determining, according to the vehicle information of the railway vehicle, a pantograph charger corresponding to the railway vehicle specifically includes:

determining, according to the vehicle identification number of the railway vehicle and the residual capacity information of each compartment, a pantograph charger corresponding to a to-be-charged compartment of the railway vehicle. The vehicle identification number includes grouping information of the railway vehicle. Taking a 3-group train as an example, the 3-group railway vehicle includes three compartments. The residual capacity information of each compartment displays that a second compartment is the to-be-charged compartment, and the pantograph charger corresponding to the railway vehicle is determined, that is, a pantograph charger corresponding to the second to-be-charged compartment is determined.

A pantograph charger arranged conforming to the moving direction of the railway vehicle is determined according to the moving direction of the railway vehicle. Specifically, in response to that the moving direction of the railway vehicle is the up direction, a pantograph charger arranged conforming to the up direction of the railway vehicle is determined. In response to that the moving direction of the railway vehicle is the down direction, a pantograph charger arranged conforming to the down direction of the railway vehicle is determined.

The pantograph charger corresponding to the railway vehicle is finally determined. The pantograph charger corresponding to the railway vehicle is a pantograph charger that corresponds to the to-be-charged compartment of the railway vehicle and is arranged conforming to the moving direction.

In this implementation, in response to determining the pantograph charger corresponding to the railway vehicle, it needs to be determined according to the vehicle information of the railway vehicle, that is, it needs to be determined according to the moving direction and the vehicle identification number of the railway vehicle and the residual capacity of each compartment, and only the compartment that needs to be charged is charged, realizing charging intellectualization and ensuring the charging accuracy and safety.

As a possible implementation, the ground charging controller controls a pantograph charger corresponding to the to-be-charged compartment of the railway vehicle in the up direction to descend, or the ground charging controller controls a pantograph charger corresponding to the to-be-charged compartment of the railway vehicle in the down direction to descend. The to-be-charged compartment is determined by the vehicle control unit according to the residual capacity information of the railway vehicle.

As a possible implementation, the pantograph charger corresponding to the railway vehicle is controlled to descend. The pantograph charger corresponding to the railway vehicle is a pantograph charger that corresponds to the to-be-charged compartment of the railway vehicle and is arranged conforming to the moving direction.

As a possible implementation, the to-be-charged compartment of the railway vehicle is determined. The to-be-charged compartment is determined according to residual capacity information of each compartment of the railway vehicle.

The pantograph charger that corresponds to to-be-charged compartment of the railway vehicle and is arranged conforming to the moving direction is controlled to descend. Each compartment of the railway vehicle is the to-be-charged compartment of the railway vehicle. In the embodiment, not only the moving direction of the railway vehicle is considered, but also the grouping of the railway vehicle and the residual capacity of each compartment are considered, it is only necessary to descend the to-be-charged compartment, which reduces costs and saves time.

As a possible implementation, prior to execution of step S307, the method further includes: receiving, by the charging controller, charging in-place information transmitted by the ATS, and controlling the pantograph charger corresponding to the moving direction of the railway vehicle to descend only after receiving the charging in-place information.

The following step may also be executed after step S307: determining whether pantograph charger descending is pantograph descending in place.

In this embodiment, pantograph descending in place refers to that the pantograph charger is in full contact with and electrically connected to the current receiver on the railway vehicle. Specifically, a pressure sensor or a distance sensor may be arranged on the pantograph charger, and whether pantograph descending is in place may be determined through a pressure signal or a distance signal, and whether pantograph descending is in place may also be determined by detecting an electrical signal. Whether pantograph descending is in place is determined by arranging mutually coupled circuits on the vehicle and the pantograph charger respectively, and measuring the magnitude of a voltage at a detection point. The potential safety hazards caused by pantograph descending not in place may be avoided by determining whether pantograph descending is in place, and the charging safety and reliability may be improved.

A pantograph descending in place signal may also determine whether pantograph descending is in place by arranging the pressure sensor or the distance sensor on the railway vehicle and detecting the pressure signal or the distance signal through the vehicle control unit, and the pantograph descending in place signal is transmitted to the charging controller.

S308: Starting charging the railway vehicle is controlled according to the charging request.

Specifically, it is controlled to start charging each compartment of the railway vehicle, and the residual capacity of each compartment does not need to be considered at this time. A to-be-charged compartment of the railway vehicle may also be determined. The to-be-charged compartment is determined according to the residual capacity information of the railway vehicle, and it is only controlled to start charging the to-be-charged compartment of the railway vehicle.

Furthermore, the pantograph charger is controlled to ascend in response to that the charging of the railway vehicle is ended, and pantograph chargerstatus information indicating that the pantograph charger is ascended is transmitted to the vehicle control unit and the signal system.

The railway vehicle charging control method according to this embodiment is combined with the signal system of the railway vehicle. The signal system determines the reserved charging parking space of the railway vehicle according to the residual capacity information, the location information and the moving plan of the railway vehicle, and transmits the charging request and the vehicle information of the railway vehicle. The vehicle control unit and the charging controller establish communication connection through the vehicle information, that is, the railway vehicle and the charging station establish communication connection, and the pantograph charger corresponding to the railway vehicle is controlled to descend, to charge the railway vehicle. The vehicle control unit and the charging controller establish communication connection, and status information of the railway vehicle is obtained in time. Moreover, the entire charging process is fully automated, high in charging efficiency, safe and reliable.

As a possible implementation, after step S308 is executed, the railway vehicle is in a charging status, a charging circuit of each compartment of the railway vehicle is in a turn-on status, a traction circuit of each compartment is in a turn-off status, and the charging circuit of each compartment is used for respectively inputting the current outputted by the charging station through the charging controller into energy storage devices of respective compartments, and the traction circuit of each compartment is used for inverting the voltage of the energy storage device of each compartment and then respectively inputting same to respective compartment driving power module.

The vehicle control unit of the railway vehicle executes the following steps:

S601: The vehicle control unit receives a dispatch instruction transmitted by the signal system.

S602: The vehicle control unit determines whether the railway vehicle satisfies an immediate dispatch condition according to the dispatch instruction, the immediate dispatch condition including that the dispatch instruction is an immediate dispatch instruction or the dispatch instruction is an upcoming dispatch instruction and each compartment is fully charged.

S603: In response to that the immediate dispatch condition is satisfied, the railway vehicle controls a charging circuit of a compartment that is being charged in each compartment to be turned off and the traction circuit of each compartment to be turned on, and transmits a pantograph ascending instruction to the charging controller, so that the charging controller controls a pantograph charger connected to the compartment that is being charged to ascend.

This embodiment executes different operations according to a dispatch plan of the signal system and the charging conditions of each compartment of the railway vehicle, and the entire process is fully automated, improving the moving safety of the railway vehicle and improving the moving efficiency.

As a possible implementation, after step S308 is executed, the railway vehicle is in a charging status, a charging circuit of each compartment of the railway vehicle is in a turn-on status, a traction circuit of each compartment is in a turn-off status, and the charging circuit of each compartment is used for respectively inputting the current outputted by the charging station through the charging controller into respective compartment power battery of each compartment, and the traction circuit of each compartment is used for inverting the voltage of the compartment power battery and then respectively inputting same to respective compartment driving power module.

The vehicle control unit of the railway vehicle executes the following steps:

S701: The vehicle control unit receives a waiting dispatch instruction transmitted by the signal system. The waiting dispatch instruction is used for indicating that the railway vehicle is in a waiting for departure sequence.

S702: The vehicle control unit starts to detect whether there is a fully charged compartment in each compartment according to the waiting dispatch instruction.

S703: In response to that there is a fully charged compartment in each compartment, the vehicle control unit controls a charging circuit of the fully charged compartment to be turned off and transmits a pantograph ascending instruction to the charging controller, so that the charging controller controls a pantograph charger connected to the fully charged compartment to ascend.

S704: The vehicle control unit receives an about-to-be-dispatched instruction transmitted by the signal system. The about-to-be-dispatched instruction is used for indicating that the railway vehicle is in an about-to-depart sequence.

S705: In response to that each compartment is fully charged, the vehicle control unit controls, according to the about-to-be-dispatched instruction, the traction circuit of each compartment to be turned on.

This embodiment executes different operations according to a dispatch plan of the signal system and the charging conditions of each compartment of the railway vehicle, and the entire process is fully automated, improving the moving safety of the railway vehicle and improving the moving efficiency.

As a possible implementation, after step S308 is executed, the railway vehicle is in a charging status, a charging circuit of each compartment of the railway vehicle is in a turn-on status, a direct current (DC) circuit of each compartment is in a turn-on status, and the charging circuit of each compartment is used for respectively inputting the current outputted by the charging station through the charging controller into energy storage devices of respective compartments, and the DC circuit of each compartment is used for reducing the voltage of the energy storage device of each compartment and then respectively inputting same to respective compartment low-voltage load.

The vehicle control unit of the railway vehicle executes the following steps:

S801: The vehicle control unit receives a dispatch-free demand instruction transmitted by the signal system.

S802: The vehicle control unit starts to detect whether there is a fully charged compartment in each compartment according to the dispatch-free demand instruction.

S803: In response to that there is a fully charged compartment in each compartment, the vehicle control unit controls a charging circuit of the fully charged compartment to be turned off and transmits a pantograph ascending instruction to the charging controller, so that the charging controller controls a pantograph charger connected to the fully charged compartment to ascend.

S804: The vehicle control unit receives a power-off instruction transmitted by the signal system, and controls the DC circuit of the fully charged compartment to disconnect according to the power-off instruction.

This embodiment may realize that the electric energy waste of the energy storage device of the railway vehicle compartment may be avoided after the charging of the railway vehicle is completed, and the moving time of the railway vehicle may be increased.

Reference is made to FIG. 2. FIG. 2 is a schematic architectural diagram of a charging system according to an embodiment of the present disclosure. In this embodiment, the signal system includes but not limited to an Automatic Train Supervision (ATS) system, an Automatic Train Protection (ATP) system, and an Automatic Train Operation (ATO) system. In this embodiment, the signal system is the ATS. A charging station is illustrated below with reference to FIG. 2.

In this embodiment, a charging station 20 includes a ground charging controller 21, a pantograph charger 22, and a ground communication module 23. The pantograph charger 22 is connected to the charging controller 21. The ground communication module 23 is configured to provide wireless communication connection. The charging controller 21 is configured to receive vehicle information of the railway vehicle and a charging request transmitted by the ATS, the vehicle information including vehicle information of the railway vehicle, establish wireless communication connection with a vehicle control unit 11 of the railway vehicle 10 according to the vehicle information of the railway vehicle, determine a pantograph charger corresponding to the railway vehicle according to the vehicle information of the railway vehicle 10, control the pantograph charger arranged corresponding to the railway vehicle to descend, and control, according to the charging request, to start charging the railway vehicle.

In this embodiment, the railway vehicle 10 includes a vehicle control unit 11, an energy storage device 13, a current receiver 14, and a vehicle communication module 12. The energy storage device 13 is configured to supply power to the railway vehicle. The current receiver 14 is electrically connected to a pantograph charger 22 in response to that the railway vehicle needs to be charged. The vehicle communication module 12 is configured to provide wireless communication connection. The vehicle control unit 11 is configured to transmit location information and residual capacity information of the railway vehicle to the ATS, the residual capacity information including residual capacity information of each compartment of the railway vehicle, receive an address of a reserved charging parking space of the railway vehicle 10 transmitted by the ATS, control the railway vehicle 10 to move to the reserved charging parking space, the address of the reserved charging parking space being determined by the ATS according to the residual capacity information, the location information and a moving plan of the railway vehicle, and receive a wireless communication connection request initiated by a ground charging controller 21, and establish wireless communication connection with the charging controller 21. The ground charging controller 21 is arranged corresponding to the reserved charging parking space of the railway vehicle, the wireless communication connection request is initiated by the charging controller 21 according to vehicle information of the railway vehicle, and the vehicle information is used by the charging controller 21 to control a pantograph charger corresponding to the railway vehicle to descend, and after it is electrically connected to the current receiver 14, the charging controller controls to start charging the railway vehicle.

In this embodiment, the charging system includes the charging station 20, the railway vehicle 10, and the ATS.

In order to conveniently describe a scene of a railway vehicle charging control method, FIG. 6 is a schematic architectural diagram of a charging system according to an embodiment of the present disclosure. As shown in FIG. 6, the charging system includes a railway vehicle 10, an ATS, and a ground charging station 20. The ATS is wirelessly connected to the railway vehicle 10, and the ATS is connected to the charging station 20 through a hard wire. The railway vehicle 10 includes a vehicle control unit 11, a power battery 13', a current receiver 14, and a vehicle communication module 12. The power battery 13' is configured to supply power to the railway vehicle. The vehicle communication module 12 is configured to provide wireless communication connection. The vehicle control unit 11 includes a Vehicle on-board Controller (VOBC) 112, a Center Control Unit (CCU) 111, and a Battery Management System (BMS) 113. The VOBC 112 and the BMS 113 are respectively connected to the CCU 111. The current receiver 14 is connected to the BMS 113 through the power battery 13'. The vehicle communication module 12 is connected to the BMS 113.

The charging station 20 includes a ground charging controller 21, a pantograph charger 22, and a ground communication module 23. The pantograph charger 22 is connected to the charging controller 21. The ground communication module 23 is configured to provide wireless communication connection. The charging controller 21 includes a charging server 211, a charger 213, and a pantograph controller 212. The ground communication module 23, the charger 213, and the pantograph controller 212 are respectively connected to the charging server 211. The pantograph controller 212 is connected to the pantograph charger 22.

The charging station 20 may be arranged at a railway platform, a vehicle depot, a parking lot, or the like.

A railway vehicle charging control method provided by the embodiment of the present disclosure includes the following steps:

S401: The CCU transmits the residual capacity information of a power battery of the railway vehicle collected by the battery management system (BMS) and location information to the ATS through the VOBC.

As a possible implementation, the location information of the railway vehicle may be collected through a GPS or a transponder or other positioning device set on the ground, and the residual capacity information and the location information are reported to the ATS in real time.

S402: The ATS determines an address of a reserved charging parking space of the railway vehicle according to the residual capacity information, the location information and a moving plan of the railway vehicle, and transmits the address of the reserved charging parking space to the CCU through the VOBC.

Specifically, a cruising range of the railway vehicle may be determined according to the residual capacity information and the location information of the railway vehicle, that is, how far the railway vehicle may travel on the residual capacity. The address of the reserved charging parking space of the railway vehicle is determined according to the cruising range and the moving plan. The moving plan of the railway vehicle is pre-stored in the ATS.

As a possible implementation, the CCU or the VOBC may also determine the cruising range of the railway vehicle according to the residual capacity information and the location information of the railway vehicle, report the cruising range to the ATS, and the address of the reserved charging parking space of the railway vehicle is determined by the ATS according to the cruising range and the moving plan.

S403: The CCU receives the address of the reserved charging parking space transmitted by the ATS, and controls the railway vehicle to move to the reserved charging parking space.

S404: The ATS transmits vehicle information of the railway vehicle and a charging request to a ground charging server. The ground charging server is arranged corresponding to the reserved charging parking space of the railway vehicle.

In this embodiment, steps S402 and S404 are executed in no particular order, and may or may not be executed at the same time.

S405: The ATS transmits moving-in-place information to the charging server after determining that the railway vehicle moves to the reserved charging parking space.

In this embodiment, the step of determining, by the ATS, that the railway vehicle moves to the reserved charging parking space specifically includes:

reporting, by the VOBC, the location information of the railway vehicle in real time; comparing, by the ATS, the location information of the railway vehicle with location information of the address of the reserved charging parking space; and if consistent, determining that the railway vehicle moves to the reserved charging parking space.

S406: The charging server initiates a wireless communication connection request to the BMS through the ground communication module according to the vehicle information after receiving the moving-in-place information of the railway vehicle, and after the BMS receives and confirms the wireless communication connection request through the vehicle communication module, wireless communication connection is established between the charging server and the BMS.

Furthermore, after the charging controller and the vehicle control unit establish wireless communication connection, the charging server shakes hands with the BMS to confirm, the charging server transmits the ground charging information to the BMS, and the charging server receives the vehicle charging information transmitted by the BMS, specifically including the following steps:

S901: The charging server transmits a serial number of the charger to the BMS.

S902: The BMS and the charging server transmit the detected pantograph charger descending status to each other.

S903: The BMS transmits information of the battery, such as the maximum allowable charging total voltage, the maximum allowable charging current, the maximum allowable charging capacity, the maximum allowable charging cell voltage, and the maximum allowable charging temperature.

S904: The charging server transmits information of the charger, such as the maximum output voltage, the minimum output voltage, the maximum output current, and the minimum output current.

S905: The BMS and the charging server mutually accept a packet sent by the other party, which is a handshake confirmation.

S906: The BMS closes charging positive and negative contactors for insulation detection, and the charging server controls the high-voltage pre-charging of the charger. After the pre-charging is completed, the charger closes the charging positive and negative contactors.

After the handshake is confirmed, the BMS transmits information such as the charging mode requirements, charging voltage requirements and charging current requirements of the battery, the current real-time voltage, current, temperature and power of the battery, and whether charging is allowed, and the charging server transmits information of the charger such as the current output voltage and output current.

According to the charging information transmitted by the BMS and the charging server, the charging status of the railway vehicle may be monitored in real time.

As a possible implementation, in response to that the railway vehicle has multiple groups, the ground communication module and the vehicle communication module may be arranged in a one-to-one correspondence. Taking three compartments as an example, in the three compartments, each compartment is provided with a vehicle communication module. The corresponding ground charging station is also provided with three ground communication modules.

The ground communication module and the vehicle communication module may not be arranged in a one-to-one correspondence. Taking three compartments as an example, in the three compartments, each compartment is provided with a vehicle communication module. The ground charging station is provided with only one ground communication module.

Figure 7:
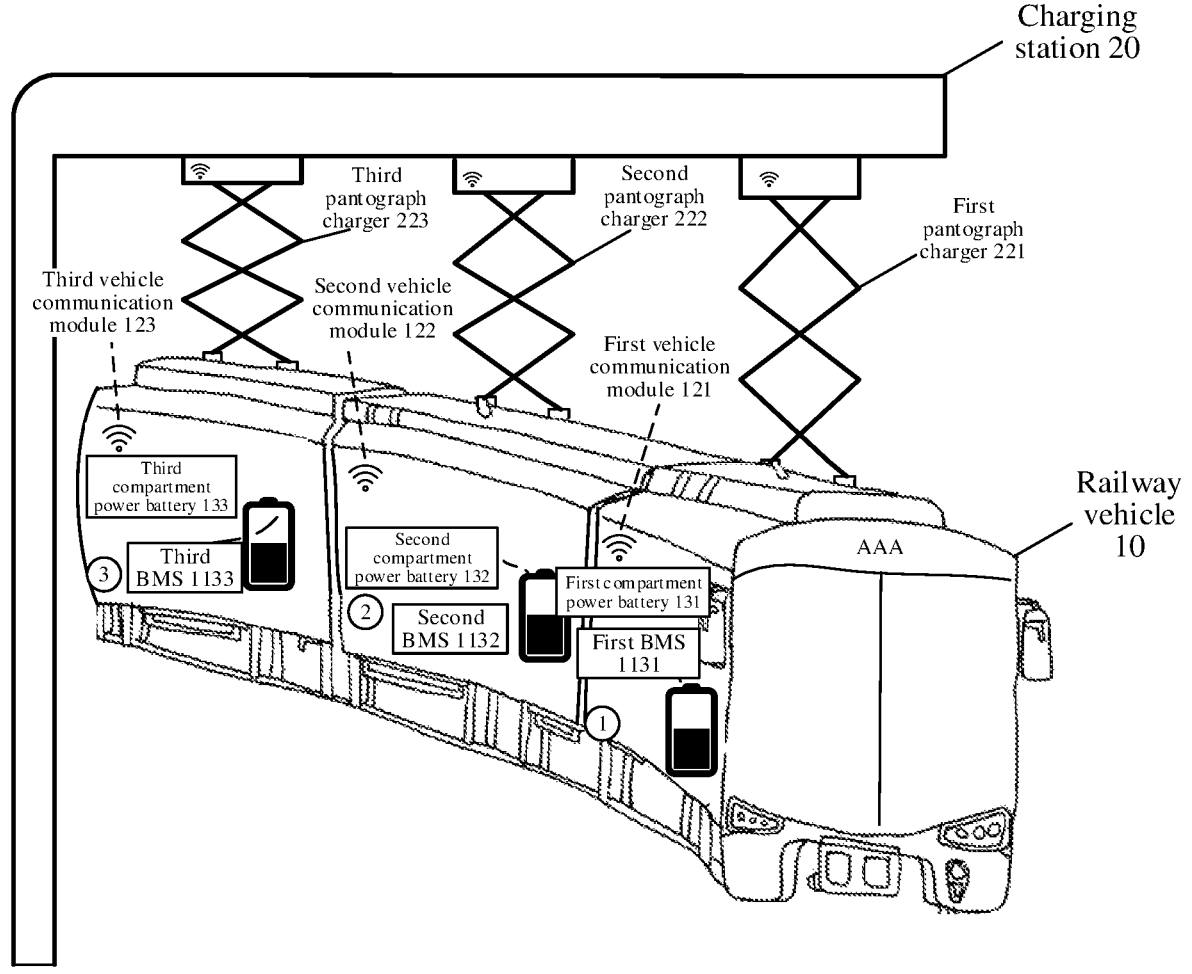
FIG. 7 is a schematic scene diagram of a railway vehicle charging control method according to an embodiment of the present disclosure.

The following describes how the charging server and the BMS establish wireless communication connection by taking a 3-group vehicle as an example with reference to FIG. 7. In this embodiment, vehicle information includes the moving direction and the vehicle identification number, which may be represented by the following codes. For example, the vehicle information is 0103ZX001, 01 indicates that the head vehicle is ahead in the direction of travel, 03 indicates that the number of groups is 3, and ZX001 indicates the vehicle number. 1003ZX001 indicates that the tail vehicle is ahead in the direction of travel, the 3-group railway vehicle, the ZX001 vehicle.

| Each compartment number | Username | Password |
|---|---|---|
| ZX001-01 | Niegbhekg | Jhi1e3g4 |
| ZX001-02 | Gnmiebgg | Nie54hr6 |
| ZX001-03 | Eenigreles | 5eni15e3 |

In response to that the ATS transmits 0103ZX001, a first ground communication module is connected, according to the username and password in the above table, to a first vehicle communication module corresponding to ZX001-01, a second ground communication module is connected to a second vehicle communication module corresponding to ZX001-02, and a third ground communication module is connected to a third vehicle communication module corresponding to ZX001-03.

In response to that the ATS transmits 1003ZX001, the first ground communication module is connected, according to the username and password in the above table, to the third vehicle communication module corresponding to ZX001-03, the second ground communication module is connected to the second vehicle communication module corresponding to ZX001-02, and the third ground communication module is connected to the first vehicle communication module corresponding to ZX001-01.

Finally, the charging server establishes wireless communication connection with each BMS.

In this embodiment, the ground communication module and the vehicle communication module may be CAN-to-WIFI modules, or other bus-to-WIFI modules. As a possible implementation, the password may also be set to be non-fixed and variable. In response to that this communication is about to end, the first ground communication module transmits a password for the next communication to the first vehicle communication module, and the next communication is connected according to the next communication password, realizing the dynamic configuration of the password. In this implementation, since the password is dynamically configured, it is not easy to be cracked, which improves the security of communication.

S407: After the charging server receives the moving-in-place information of the railway vehicle, the charging server controls, according to the vehicle information of the railway vehicle, a pantograph charger corresponding to the railway vehicle to descend through a pantograph controller.

S408: The charging server determines that the pantograph charger is descended in place, and controls, according to the charging request, the charger to start charging the railway vehicle.

As a possible implementation, a pressure sensor and a distance sensor may be arranged on the railway vehicle, and whether pantograph descending is in place may be determined by the charging server through a pressure signal or a distance signal, and whether pantograph descending is in place may also be determined by detecting an electrical signal.

Furthermore, the charger stops charging the railway vehicle in response to that the charging of the railway vehicle is ended, and meanwhile, the pantograph controller controls the pantograph charger to ascend, and the pantograph chargerstatus information indicating that the pantograph charger is ascended is transmitted by the charging server to the BMS and the ATS. The railway vehicle charging control method in this embodiment combines the charging system with the signal system to realize automatic charging of the railway vehicle, so that the railway vehicle may also be charged during the operation process, and the charging efficiency and operation efficiency are improved. At the same time, the ground charging equipment may obtain the status information of railway vehicles in real time, so that the signal system may monitor the status information of the railway vehicle in real time, improving the safety of operation, and the railway vehicle may also be scheduled in time according to the status information of railway vehicle.

Reference is made to FIG. 6. FIG. 6 is a schematic architectural diagram of a charging system according to an embodiment of the present disclosure. A charging system, a charging station and a railway vehicle are illustrated below with reference to FIG. 6. In this embodiment, the signal system includes but not limited to an Automatic Train Supervision (ATS) system, an Automatic Train Protection (ATP) system, and an Automatic Train Operation (ATO) system. The signal system in this embodiment is the ATS.

In this embodiment, the charging station includes a ground charging controller 21, a pantograph charger 22, and a ground communication module 23. The pantograph charger 22 is connected to the charging controller 21. The ground communication module 23 is configured to provide wireless communication connection. The charging controller 21 includes a charging server 211, a charger 213, and a pantograph controller 212. The ground communication module 23, the charger 213, and the pantograph controller 212 are respectively connected to the charging server 211. The pantograph controller 212 is connected to the pantograph charger 22.

In this embodiment, the railway vehicle includes a vehicle control unit 11, an energy storage device 13, a current receiver 14, and a vehicle communication module 12. The energy storage device 13 is configured to supply power to the railway vehicle. The energy storage device 13 may be an energy storage device such as a power battery and a capacitor. The current receiver 14 is electrically connected to the pantograph charger 22 in response to that the railway vehicle needs to be charged. The vehicle communication module 12 is configured to provide wireless communication connection. The vehicle control unit 11 includes a VOBC 112, a CCU 111, and a BMS 113. The VOBC 112 and the BMS 113 are respectively connected to the CCU 111. The current receiver 14 is connected to the BMS 113 through the power battery 13'. The vehicle communication module 12 is connected to the BMS 113.

In this embodiment, the charging system includes the charging station 20, the railway vehicle 10, and the ATS. The CCU 111 transmits the residual capacity information of the power battery 13' of the railway vehicle 10 collected by the battery management system (BMS) 113 and location information to the ATS through the VOBC 112.

The ATS determines an address of a reserved charging parking space of the railway vehicle according to the residual capacity information, the location information and a moving plan of the railway vehicle, and transmits the address of the reserved charging parking space to the CCU through the VOBC.

The CCU 111 receives the address of the reserved charging parking space transmitted by the ATS, and controls the railway vehicle to move to the reserved charging parking space.

The ATS transmits vehicle information of the railway vehicle and a charging request to a ground charging server 211. The vehicle information includes at least the moving direction and the vehicle identification number of the railway vehicle. The ground charging server 211 is arranged corresponding to the reserved charging parking space of the railway vehicle. The ATS transmits moving-in-place information to the charging server 211 after determining that the railway vehicle moves to the reserved charging parking space.

The charging server 211 initiates a wireless communication connection request to the BMS 113 through the ground communication module 23 according to the moving direction and the vehicle identification number after receiving the moving-in-place information of the railway vehicle, and after the BMS 113 receives and confirms the wireless communication connection request through the vehicle communication module, wireless communication connection is established between the charging server 211 and the BMS 113.

After charging server 211 receives the moving-in-place information of the railway vehicle, the pantograph controller 212 controls, according to the vehicle information of the railway vehicle, a pantograph charger corresponding to the railway vehicle to descend, and controls, according to the charging request, to start charging the railway vehicle.

Figure 8:
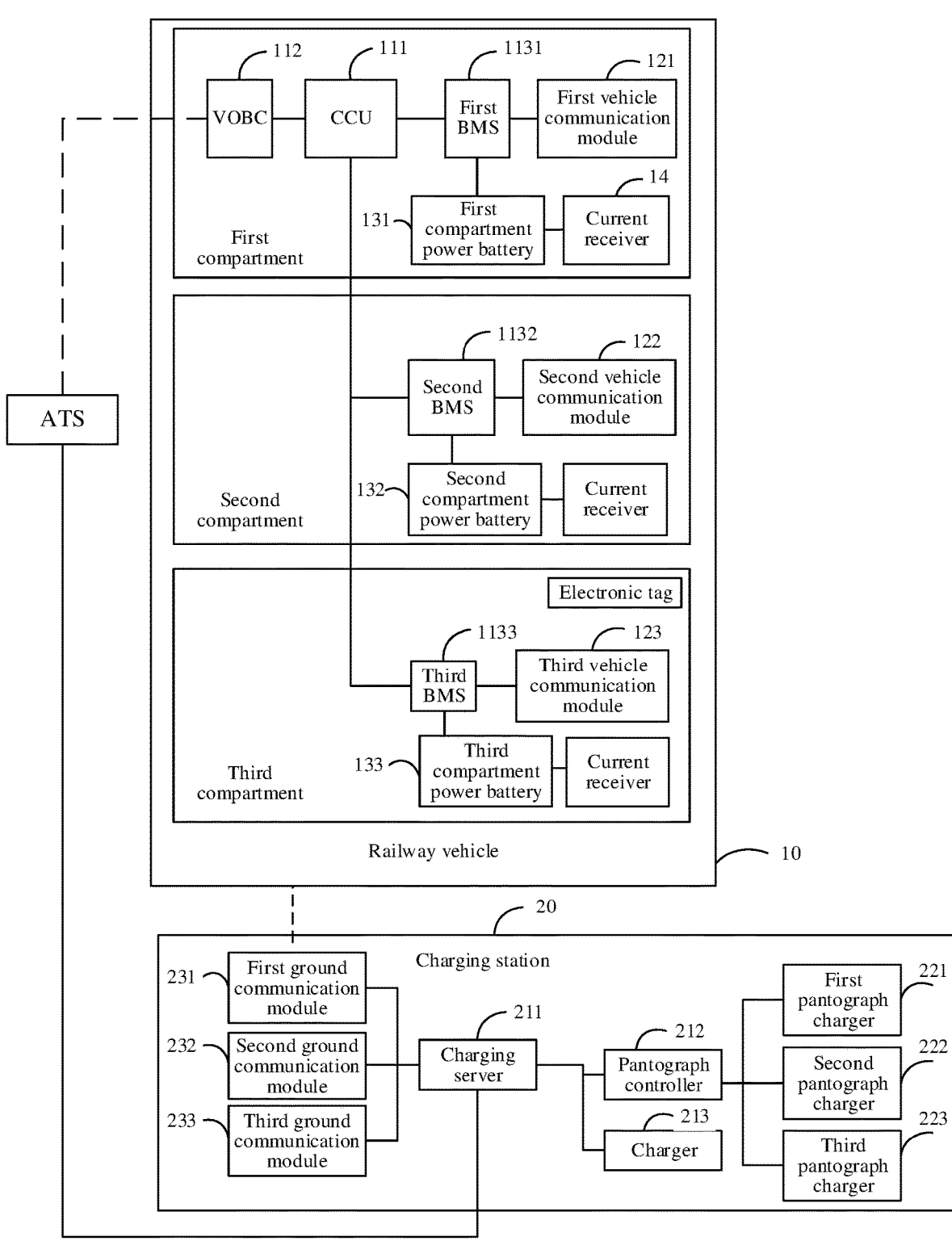
FIG. 8 is a schematic architectural diagram of a charging system according to an embodiment of the present disclosure.

FIG. 7 is a schematic scene diagram of a railway vehicle charging control method according to yet another embodiment of the present disclosure. As shown in FIG. 8, the railway vehicle 10 includes multiple compartments, such as a first compartment, a second compartment, and a third compartment. The multiple compartments are provided with multiple power batteries. It is to be understood that the compartments and the compartment power batteries may be in a one-to-one relationship, for example, a compartment is provided with a compartment power battery. The compartments and the compartment power batteries may also be in a many-to-one relationship, for example, multiple compartments share a compartment power battery. The present disclosure does not limit the corresponding relationship between the number of compartments and the compartment power batteries. The present disclosure exemplifies the one-to-one relationship between the compartments and the compartment power batteries. It is to be understood that the compartments and the compartment power batteries are not in one-to-one relationship. For example, only the head vehicle and the tail vehicle may be provided with power batteries.

Taking the railway vehicle including three compartments as an example, the first compartment includes a first compartment power battery 131, a first BMS 1131 and a first charging communication module 121. Similarly, the second compartment includes a second compartment power battery 132, a second BMS 1132 and a second charging communication module 122, and the third compartment includes a third compartment power battery 133, a third BMS 1133 and a third charging communication module 123. It is to be understood that the power battery is used for providing power for the compartment. The BMS is configured to monitor the battery status of the corresponding compartment power battery, control whether the compartment power battery is charged, and communicate with the charging station 20. The vehicle communication module is configured to transmit information in the railway vehicle to a communication module in the charging station 20. For example, the vehicle communication module may be a CAN-to-WIFI module, configured to convert a CAN signal in the railway vehicle into a WIFI signal and transmit same to the charging station 20.

As shown in FIG. 8, in this embodiment, each power battery has a corresponding pantograph charger for charging, and each compartment is provided with a current receiver 14. The electric energy of the pantograph charger passes through the current receiver 14 to the compartment power battery 13' to charge. It is to be understood that only the head vehicle and the tail vehicle may be provided with power batteries, and the corresponding current receivers are also only arranged on the head vehicle and the tail vehicle. It is to be understood that each pantograph charger is provided with a ground communication module to establish communication with the vehicle communication module of each compartment. For example, the charging station 20 includes a first pantograph charger 221, a second pantograph charger 222 and a third pantograph charger 223. The first pantograph charger 221 charges the first compartment power battery 131. The second pantograph charger 222 charges the second compartment power battery 132. The third pantograph charger 223 charges the third compartment power battery 133.

Reference is made to FIG. 8. FIG. 8 is a schematic architectural diagram of a charging system according to an embodiment of the present disclosure. As shown in FIG. 8, the charging system includes a railway vehicle 10, an ATS, and a ground charging station 20. The ATS is wirelessly connected to the railway vehicle 10, and the ATS is connected to the charging station 20 through a hard wire. The railway vehicle 10 includes multiple compartments. The following description is given by taking the railway vehicle including three compartments as an example.

In this embodiment, the vehicle control unit includes a VOBC 112, a CCU 111 and a BMS 113. The VOBC 112 and the CCU 111 are arranged in the same compartment or any compartment, and are arranged in the first compartment in this embodiment. In order to ensure the driving safety of the railway vehicle, a spare vehicle control unit is generally arranged to form a redundant backup with another vehicle control unit. In response to that one of the vehicle control units fails, the other vehicle control unit takes over. One or more BMSs 113 may be arranged, and three BMSs 113 are arranged in this embodiment, namely, the first BMS 1131, the second BMS 1132 and the third BMS 1133, which are distributed in each compartment and are respectively connected to the CCU 111. Each compartment is provided with a current receiver 14, and the electric energy is charged by the pantograph charger to the compartment power battery through the current receiver 14. Each compartment is provided with vehicle communication modules, namely, the first vehicle communication module 121, the second vehicle communication module 122 and the third vehicle communication module 123, which are respectively connected to the first BMS 1131, the second BMS 1132 and the third BMS 1133.

The charging station 20 includes a ground charging controller, a pantograph charger, and a ground communication module. The charging controller includes a charging server 211, a charger 213, and a pantograph controller 212. The ground communication module, the charger 213, and the pantograph controller 212 are respectively connected to the charging server 211. The pantograph controller 212 is connected to the pantograph charger. The number of pantograph chargers may be multiple. In this example, only three pantograph chargers are used for illustration, namely, a first pantograph charger 221, a second pantograph charger 222, and a third pantograph charger 223. The three pantograph chargers are connected to the pantograph controller 212, and the charging server 1 controls lifting/lowering of the pantograph charger through the pantograph controller.

Each pantograph charger is provided with charging communication modules, such as a first ground communication module 231, a second ground communication module 232 and a third ground communication module 233, which establish communication connection with vehicle communication modules of the corresponding compartment, such as a first vehicle communication module 121, a second vehicle communication module 122 and a third vehicle communication module 123.

A railway vehicle charging control method is introduced below with reference to FIG. 7 and FIG. 8. Specific execution steps are as follows:

S501: The CCU transmits the residual capacity information of a power battery of the railway vehicle collected by the battery management system (BMS) of each compartment and location information to the ATS through the VOBC.

The residual capacity information refers to residual capacity information of power batteries of all compartments of the railway vehicle.

S502: The ATS determines an address of a reserved charging parking space of the railway vehicle according to the residual capacity information, the location information and a moving plan of the railway vehicle, and transmits the address of the reserved charging parking space to the CCU through the VOBC.

S503: The CCU receives the address of the reserved charging parking space transmitted by the ATS, and controls the railway vehicle to move to the reserved charging parking space. S504: The ATS transmits vehicle information of the railway vehicle and a charging request to a ground charging server. The vehicle information includes the moving direction and the vehicle identification number of the railway vehicle. The ground charging server is arranged corresponding to the reserved charging parking space of the railway vehicle.

Taking three compartments as an example, the ATS transmits the vehicle information of the railway vehicle and the charging request to the ground charging server. The vehicle information is 0103ZX001, 01 indicates that the head vehicle is ahead in the direction of travel, 03 indicates that the number of groups is 3, and ZX001 indicates the vehicle number. The vehicle information 1003ZX001 indicates that the tail vehicle is ahead in the direction of travel, the 3-group railway vehicle, the ZX001 vehicle.

S505: The ATS transmits moving-in-place information to the charging server after determining that the railway vehicle moves to the reserved charging parking space. S506: The charging server initiates a wireless communication connection request to each BMS through the ground communication module according to the moving direction and the vehicle identification number after receiving the moving-in-place information of the railway vehicle, and after each BMS receives and confirms the wireless communication connection request through the vehicle communication module, wireless communication connection is established between the charging server and each BMS.

In this embodiment, in response to that the railway vehicle has multiple groups, the ground communication module and the vehicle communication module may be arranged in a one-to-one correspondence. Taking three compartments as an example, in the three compartments, each compartment is provided with a vehicle communication module. The corresponding ground charging station is also provided with three ground communication modules.

The following describes how the charging server and the BMS establish wireless communication connection by taking a 3-group vehicle as an example below. In this embodiment, vehicle information includes the moving direction and the vehicle identification number, which may be represented by the following codes. For example, the vehicle information is 0103ZX001, 01 indicates that the head vehicle is ahead in the direction of travel, 03 indicates that the number of groups is 3, that is, the railway vehicle includes three compartments, and ZX001 indicates the vehicle number. 1003ZX001 indicates that the tail vehicle is ahead in the direction of travel, the 3-group railway vehicle, the ZX001 vehicle.

| Each compartment number | Username | Password |
|---|---|---|
| ZX001-01 | Niegbhekg | Jhi1e3g4 |
| ZX001-02 | Gnmiebgg | Nie54hr6 |
| ZX001-03 | Eenigreles | 5eni15e3 |

In response to that the ATS transmits 0103ZX001, a first ground communication module is connected, according to the username and password in the above table, to a first vehicle communication module corresponding to ZX001-01, a second ground communication module is connected to a second vehicle communication module corresponding to ZX001-02, and a third ground communication module is connected to a third vehicle communication module corresponding to ZX001-03.

In response to that the ATS transmits 1003ZX001, the first ground communication module is connected, according to the username and password in the above table, to the third vehicle communication module corresponding to ZX001-03, the second ground communication module is connected to the second vehicle communication module corresponding to ZX001-02, and the third ground communication module is connected to the first vehicle communication module corresponding to ZX001-01.

Finally, the charging server establishes wireless communication connection with each BMS.

In this embodiment, the ground communication module and the vehicle communication module may be CAN-to-WIFI modules, or other bus-to-WIFI modules.

S507: The charging server determines, according to the moving direction and the vehicle identification number of the railway vehicle, a pantograph charger corresponding to the railway vehicle, and controls the corresponding pantograph charger to descend through the pantograph controller.

As an implementation of this embodiment, the charging server determines, according to the moving direction of the railway vehicle, pantograph chargers arranged corresponding to the moving direction, and determines the number of compartments of the railway vehicle according to the vehicle identification number, so as to determine the pantograph charger corresponding to each compartment of the railway vehicle, thereby determining the pantograph charger corresponding to the railway vehicle to be a pantograph charger that corresponds to each compartment of the railway vehicle and is arranged conforming to the moving direction. The pantograph charger that corresponds to each compartment of the railway vehicle and is arranged conforming to the moving direction is controlled by the pantograph controller to descend.

As an implementation of this embodiment, the vehicle information further includes residual capacity information of each compartment of the railway vehicle. A pantograph charger corresponding to the to-be-charged compartment of the railway vehicle is determined according to the vehicle identification number of the railway vehicle and the residual capacity information of each compartment, and a pantograph charger arranged conforming to the moving direction of the railway vehicle is determined according to the moving direction of the railway vehicle, so as to determine the pantograph charger corresponding to the railway vehicle. The pantograph charger corresponding to the railway vehicle is a pantograph charger that corresponds to the to-be-charged compartment of the railway vehicle and is arranged conforming to the moving direction.

The pantograph charger that corresponds to the to-be-charged compartment of the railway vehicle and is arranged conforming to the moving direction is controlled by the pantograph controller to descend.

S508: The charging server determines that the pantograph charger is descended in place, and controls, according to the charging request, the charger to start charging the railway vehicle.

The charging server may choose to start charging all compartments through the charger or only charge the to-be-charged compartment.

The railway vehicle charging control method in this embodiment combines the charging system with the signal system to realize automatic charging of the railway vehicle, so that the railway vehicle may also be charged during the operation process, and the charging efficiency and operation efficiency are improved. At the same time, the ground charging equipment may obtain the status information of railway vehicles in real time, so that the signal system may monitor the status information of the railway vehicle in real time, improving the safety of operation, and the railway vehicle may also be scheduled in time according to the status information of railway vehicle.

Figures 9, 10:
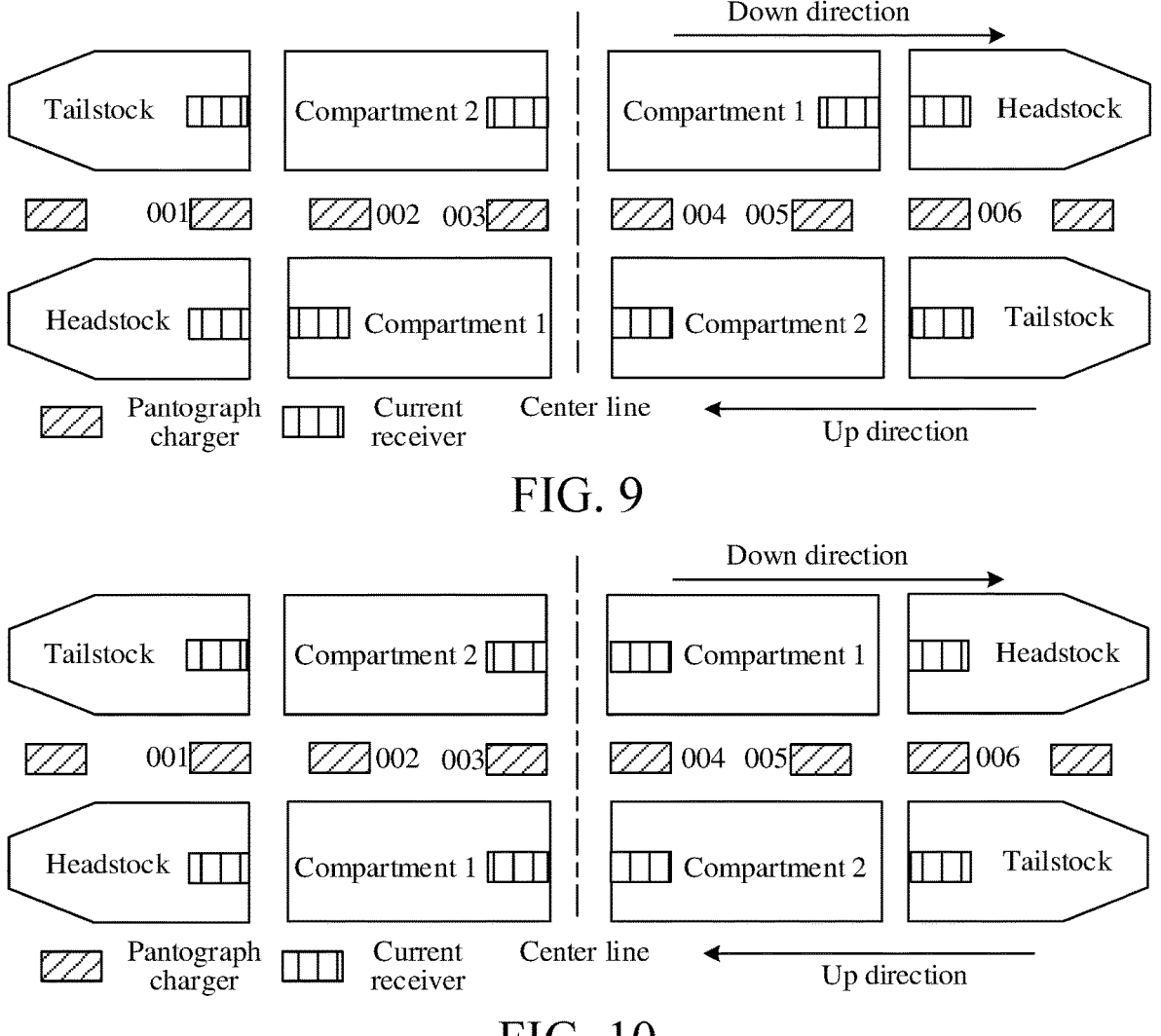
FIG. 9 is a schematic distribution diagram I of a railway vehicle current receiver according to an embodiment of the present disclosure.
FIG. 10 is a schematic distribution diagram II of a railway vehicle current receiver according to an embodiment of the present disclosure.

As a possible implementation, the vehicle information of the railway vehicle further includes distribution information of the current receiver. The following describes how to determine the pantograph charger corresponding to each compartment of the railway vehicle with reference to FIG. 9 and FIG. 10.

In response to that the current receiver of the railway vehicle is asymmetrically arranged about a center line of the railway vehicle in a lengthwise direction, the pantograph charger corresponding to each compartment of the railway vehicle in the up direction is different from the pantograph charger corresponding to each compartment of the railway vehicle in the down direction. Taking the 4-group vehicle in FIG. 9 as an example, the railway vehicle includes a head vehicle, a tail vehicle, a compartment 1 and a compartment 2. The current receivers of the compartment 1, the compartment 2 and the tail vehicle are arranged in the same position, and the arrangement of the current receiver of the head vehicle is different, that is, the distribution of the current receivers of the railway vehicle is asymmetrical with respect to the center line of the railway vehicle in the lengthwise direction. In response to that the moving direction of the railway vehicle is the up direction, the pantograph chargers corresponding to the compartments are 001, 002, 004 and 006. In response to that the moving direction of the railway vehicle is the down direction, the pantograph chargers corresponding to the compartments are 001, 003, 005 and 006.

In response to that the current receiver of the railway vehicle is symmetrically arranged about the center line of the railway vehicle in the lengthwise direction, the pantograph charger corresponding to each compartment of the railway vehicle in the up direction is the same as the pantograph charger corresponding to each compartment of the railway vehicle in the down direction. Taking the 4-group vehicle in FIG. 9 as an example, the railway vehicle includes a head vehicle, a tail vehicle, a compartment 1 and a compartment 2. The current receivers of the compartment 1, the compartment 2 and the tail vehicle are arranged asymmetrically with respect to the center line of the railway vehicle in the lengthwise direction. In response to that the moving direction of the railway vehicle is the up direction, the pantograph chargers corresponding to the compartments are 001, 003, 004 and 006. In response to that the moving direction of the railway vehicle is the down direction, the pantograph chargers corresponding to the compartments are also 001, 003, 004 and 006. As a result, the arrangement number of pantograph chargers and current receivers may be reduced, thereby reducing costs.

Considering that during the operation of the railway vehicle, the moving direction changes, that is, the commutation scene, the charging polarity may change at this time. In order to facilitate charging, specifically, the current receiver in this embodiment includes a first electrode plate, a second electrode plate and a third electrode plate arranged in sequence along a first direction. The first electrode plate and the third electrode plate are symmetrical about the second plate, and the polarity of the first plate and the polarity of the third plate are opposite to the polarity of the second plate. The first direction is a width direction or a length direction of the railway vehicle. For example, in response to that the first electrode plate and the third electrode plate are positive electrodes, the second electrode plate is a negative electrode, or in response to that the first electrode plate and the third electrode plate are negative electrodes, the second electrode plate is a positive electrode.

A current collector is arranged on the corresponding pantograph charger. The current collector includes a first electrode plate and a second electrode plate arranged in sequence along the first direction. The polarities of the first electrode plate and the second electrode plate are opposite. The polarity of the first plate of the current collector is the same as that of the second plate of the current receiver. In response to that the pantograph charger is descended in place, the first electrode plate of the current collector intersects with the second electrode plate of the current receiver, and the first electrode plate of the current collector intersects with the first electrode plate of the current receiver (the railway vehicle runs in the up direction), or the first electrode plate of the current collector intersects the third electrode plate of the current receiver (the railway vehicle runs in the down direction).

That is, in response to that the first electrode plate and the second electrode plate of the current collector are arranged along the first direction, the first electrode plate, the second electrode plate and the third electrode plate of the current receiver are arranged along the second direction. In response to that the first electrode plate and the third electrode plate of the current receiver are positive electrodes, and the second electrode plate is a negative electrode, the first electrode plate of the current collector is a negative electrode. Alternatively, in response to that the first electrode plate and the third electrode plate of the current receiver are negative electrodes, and the second electrode plate is a negative electrode, the first electrode plate of the current collector is a positive electrode.

In response to that there are multiple compartments, the second electrode plates of multiple current receivers have the same polarity and are located on the centerline of the compartment of the railway vehicle where the second electrode plates are located. In this way, in response to that the railway vehicle is reversed, there is no need to change the location of the pantograph charger or the location of the current receiver, which may improve the charging flexibility and convenience of the railway vehicle.

In the descriptions of this specification, a description of a reference term such as "an embodiment", "some embodiments", "an example", "a specific example", or "some examples", "implementation" means that a specific feature, structure, material, or characteristic that is described with reference to the embodiment or the example is included in at least one embodiment or example of the present disclosure. In this specification, schematic descriptions of the foregoing terms are not necessarily directed at the same embodiment or example. Besides, the specific features, the structures, the materials or the characteristics that are described may be combined in proper manners in any one or more embodiments or examples. In addition, a person skilled in the art may integrate or combine different embodiments or examples described in the specification and features of the different embodiments or examples as long as they are not contradictory to each other.

In addition, terms "first" and "second" are used merely for the purpose of description, and shall not be construed as indicating or implying relative importance or implying a quantity of indicated technical features. Therefore, a feature restricted by "first" or "second" may explicitly indicate or implicitly include at least one of such features. In description of the present disclosure, "multiple" means at least two, such as two and three unless it is specifically defined otherwise.

Any process or method description in the flowchart or described in other ways herein can be understood as a module, segment or part of a code that includes one or more executable instructions for implementing customized logic functions or steps of the process, and the scopes of the preferred embodiments of the present disclosure include additional implementations, which may not be in the order shown or discussed, including performing functions in a substantially simultaneous manner or in reverse order according to the functions involved. This should be understood by a person skilled in the art to which the embodiments of the present disclosure belong.

What is claimed is:

1. A railway vehicle charging control method, comprising the following steps:
   receiving vehicle information of the railway vehicle and a charging request transmitted by a railway signal system;
   establishing wireless communication connection with a vehicle control unit of the railway vehicle according to the vehicle information of the railway vehicle;
   determining, according to the vehicle information of the railway vehicle, a pantograph charger corresponding to the railway vehicle;
   controlling the pantograph charger corresponding to the railway vehicle to descend; and controlling, according to the charging request, to start charging the railway vehicle,
   wherein the vehicle information comprises a moving direction and a vehicle identification number of the railway vehicle, and the step of determining, according to the vehicle information of the railway vehicle, a pantograph charger corresponding to the railway vehicle comprises:
   determining, according to the vehicle identification number of the railway vehicle, a pantograph charger corresponding to each compartment of the railway vehicle;
   determining, according to a moving direction of the railway vehicle, a pantograph charger arranged conforming to the moving direction of the railway vehicle; and
   determining the pantograph charger corresponding to the railway vehicle, the pantograph charger corresponding to the railway vehicle being a pantograph charger that corresponds to each compartment of the railway vehicle and is arranged conforming to the moving direction.

2. The method according to claim 1, wherein the step of controlling the pantograph charger corresponding to the railway vehicle to descend comprises:
   controlling the pantograph charger corresponding to the railway vehicle to descend, the pantograph charger corresponding to the railway vehicle being a pantograph charger that corresponds to each compartment of the railway vehicle and is arranged conforming to the moving direction.

3. The method according to claim 1, wherein the vehicle information further comprises residual capacity information of each compartment, and the step of controlling, according to the charging request, to start charging the railway vehicle comprises:
   determining a to-be-charged compartment of the railway vehicle according to the residual capacity information of each compartment; and
   controlling, according to the charging request, to start charging the to-be-charged compartment of the railway vehicle.

4. The method according to claim 1, wherein the vehicle information further comprises residual capacity information of each compartment, and the step of controlling the pantograph charger corresponding to the railway vehicle to descend comprises:
   determining a to-be-charged compartment of the railway vehicle according to residual capacity information of each compartment of the railway vehicle; and
   controlling the pantograph charger that corresponds to the to-be charged compartment of the railway vehicle and is arranged conforming to the moving direction of the railway vehicle to descend.

5. The method according to claim 1, further comprising:
   controlling the pantograph charger to ascend in response to that the charging of the railway vehicle is ended, and transmitting status information indicating that the pantograph charger is ascended to the vehicle control unit and the railway signal system.

6. The method according to claim 1, wherein the vehicle information further comprises distribution information of a current receiver, the moving direction of the railway vehicle comprises an up direction and a down direction, and the step of determining a pantograph charger corresponding to the railway vehicle comprises:
   in response to that the current receiver of the railway vehicle is symmetrically arranged about a center line of the railway vehicle in a lengthwise direction, the pantograph charger corresponding to each compartment of the railway vehicle in the up direction being the same as the pantograph charger corresponding to each compartment of the railway vehicle in the down direction.

7. The method according to claim 2, wherein the vehicle information further comprises distribution information of a current receiver, the moving direction of the railway vehicle comprises an up direction and a down direction, and the step of determining a pantograph charger corresponding to the railway vehicle comprises:

in response to that the current receiver of the railway vehicle is symmetrically arranged about a center line of the railway vehicle in a lengthwise direction, the pantograph charger corresponding to each compartment of the railway vehicle in the up direction being the same as the pantograph charger corresponding to each compartment of the railway vehicle in the down direction.

8. The method according to claim 1, wherein the vehicle information comprises a moving direction and a vehicle identification number of the railway vehicle, and the step of establishing wireless communication connection with a vehicle control unit of the railway vehicle according to the moving direction and the vehicle identification number in the vehicle information of the railway vehicle comprises:

finding, according to a configuration table, a wireless network user name and password corresponding to the moving direction and the vehicle identification number of the railway vehicle; transmitting the wireless network user name and password to the vehicle control unit; receiving and comparing, by the vehicle control unit, the wireless network user name and password with a pre-stored wireless network user name and password; and establishing the wireless communication connection after confirming to be consistent.

9. The method according to claim 1, wherein after the step of controlling the pantograph charger to descend, the method further comprises:

determining, through a pressure signal, a distance signal, or an electrical signal, whether pantograph descending is in place.

10. A railway vehicle charging control method, comprising the following steps:

transmitting location information and residual capacity information of a railway vehicle to a railway signal system;

receiving an address of a reserved charging parking space of the railway vehicle transmitted by the railway signal system, and controlling the railway vehicle to move to the reserved charging parking space, the address of the reserved charging parking space being determined by the railway signal system according to the residual capacity information, the location information and a moving plan of the railway vehicle; and receiving a wireless communication connection request initiated by a ground charging controller, and establishing wireless communication connection with the charging controller, wherein the charging controller is arranged corresponding to the reserved charging parking space of the railway vehicle, the wireless communication connection request is initiated by the charging controller according to vehicle information of the railway vehicle, and the vehicle information is used by the charging controller to control a pantograph charger corresponding to the railway vehicle to descend, and to start charging the railway vehicle according to a charging request of the railway signal system.

11. A railway vehicle charging control method, comprising the following steps:

obtaining, by a railway signal system, location information and residual capacity information of a railway vehicle, determining an address of a reserved charging parking space of the railway vehicle according to the residual capacity information, the location information and a moving plan of the railway vehicle, and transmitting the address of the reserved charging parking space to a vehicle control unit of the railway vehicle;

receiving, by the vehicle control unit, the address of the reserved charging parking space of the railway vehicle transmitted by the railway signal system, and controlling the railway vehicle to move to the reserved charging parking space;

transmitting, by the railway signal system, vehicle information of the railway vehicle and a charging request to a ground charging controller, the ground charging controller being arranged corresponding to the reserved charging parking space of the railway vehicle;

initiating, by the charging controller, a wireless communication connection request according to the vehicle information of the railway vehicle, and after the vehicle control unit receives and confirms the wireless communication connection request, establishing wireless communication connection between the charging controller and the vehicle control unit; and controlling, by the charging controller according to the vehicle information of the railway vehicle, a pantograph charger corresponding to the railway vehicle to descend, and controlling, according to the charging request, to start charging the railway vehicle.

12. The method according to claim 11, wherein the step of determining an address of a reserved charging parking space of the railway vehicle according to the residual capacity information, the location information and a moving plan of the railway vehicle comprises:

determining a cruising range according to the residual capacity information and the location information of the railway vehicle, and determining the address of the reserved charging parking space of the railway vehicle according to the cruising range and the moving plan.

13. The method according to claim 11, further comprising:

calculating, by the charging controller after receiving the charging request of the railway vehicle transmitted by the railway signal system, an estimated charging duration and feeding back to the railway signal system; and adjusting, by the railway signal system, an operation plan according to the estimated charging duration and the address of the reserved charging parking space.

* * * * *